US012725086B2

(12) United States Patent
Alperin

(10) Patent No.: US 12,725,086 B2
(45) Date of Patent: Sep. 1, 2026

(54) APPARATUS AND METHODS FOR GENERATING DATA INTELLIGENCE

(71) Applicant: SurvivorNet, Inc., New York, NY (US)

(72) Inventor: Steven David Alperin, New York, NY (US)

(73) Assignee: SurvivorNet, Inc., New York, NY (US)

( * ) Notice: Subject to any disclaimer, the term of this patent is extended or adjusted under 35 U.S.C. 154(b) by 0 days.

(21) Appl. No.: 19/057,579

(22) Filed: Feb. 19, 2025

(65) Prior Publication Data

US 2026/0244980 A1 Aug. 20, 2026

(51) Int. Cl.

| | |
|---|---|
| ***G06N 20/00*** | (2019.01) |
| ***G06F 16/2457*** | (2019.01) |
| ***G06F 16/248*** | (2019.01) |

(52) U.S. Cl.

CPC ....... *G06N 20/00* (2019.01); *G06F 16/24578* (2019.01); *G06F 16/248* (2019.01)

(58) Field of Classification Search

None

See application file for complete search history.

(56) References Cited

U.S. PATENT DOCUMENTS

| | | | | |
|---|---|---|---|---|
| 11,152,120 | B2 | 10/2021 | Britt et al. | |
| 11,862,345 | B2 | 1/2024 | Ghazaleh et al. | |
| 2007/0288519 | A1* | 12/2007 | Ford | G16H 10/60 |
| 2013/0191135 | A1* | 7/2013 | Camacho | G16H 40/20 705/2 |
| 2017/0116379 | A1* | 4/2017 | Scott | G16H 50/20 |
| 2018/0211008 | A1* | 7/2018 | Cox | G16H 50/70 |
| 2018/0330061 | A1 | 11/2018 | Amiel et al. | |
| 2022/0125386 | A1* | 4/2022 | Marras | A61B 5/1114 |

(Continued)

FOREIGN PATENT DOCUMENTS

| | | |
|---|---|---|
| DE | 202024100834 U1 | 3/2024 |

OTHER PUBLICATIONS

Bright, Tiffani J., Anthony Wong, Ravi Dhurjati, Erin Bristow, Lori Bastian, Remy R. Coeytaux, Gregory Samsa et al. "Effect of clinical decision-support systems: a systematic review." Annals of internal medicine 157, No. 1 (2012): 29-43. (Year: 2012).*

(Continued)

*Primary Examiner* — Vincent Gonzales
(74) *Attorney, Agent, or Firm* — CALDWELL LLC

(57) ABSTRACT

Apparatus for generating data intelligence and methods used therein include a processor and a memory connected to the processor, wherein the memory contains instructions configuring the processor to receive digital records, each of which includes a plurality of reference attributes, receive query data including a plurality of query attributes, identify one or more relevant digital records by matching one or more query attributes with one or more reference attributes, generate, using an output generation machine-learning model, one or more output data structures as a function of the one or more relevant digital records, calculate an intelligence metric as a function of each output data structure of the one or more output data structures, wherein the intelligence metric includes an estimated likelihood of positive outcome, and select at least a recommended output data structure as a function of the one or more intelligence metrics.

16 Claims, 9 Drawing Sheets

(56) References Cited

U.S. PATENT DOCUMENTS

| | | | |
|---|---|---|---|
| 2023/0048995 | A1 | 2/2023 | Ekström et al. |
| 2024/0062859 | A1 | 2/2024 | Gnanasambandam et al. |

OTHER PUBLICATIONS

Awaysheh, Abdullah, Jeffrey Wilcke, François Elvinger, Loren Rees, Weiguo Fan, and Kurt L. Zimmerman. "Review of medical decision support and machine-learning methods." Veterinary pathology 56, No. 4 (2019): 512-525. (Year: 2019).*

Zangerle, Eva, and Christine Bauer. "Evaluating recommender systems: survey and framework." ACM computing surveys 55, No. 8 (2022): 1-38. (Year: 2022).*

Van der Waa, Jasper, Tjeerd Schoonderwoerd, Jurriaan van Diggelen, and Mark Neerincx. "Interpretable confidence measures for decision support systems." International Journal of Human-Computer Studies 144 (2020): 11 pages. (Year: 2020).*

Niraula, Dipesh, Wenbo Sun, Jionghua Jin, Ivo D. Dinov, Kyle Cuneo, Jamalina Jamaluddin, Martha M. Matuszak et al. "A clinical decision support system for AI-assisted decision-making in response-adaptive radiotherapy (ARCliDS)." Scientific Reports 13, No. 1 (2023): 5279. (Year: 2023).*

Bahdanau, Dzmitry, Kyunghyun Cho, and Yoshua Bengio. "Neural machine translation by jointly learning to align and translate." arXiv preprint arXiv:1409.0473 (2014). (Year: 2014).*

* cited by examiner 600
604
608
612
616
620
624
628
632
636
640

APPARATUS AND METHODS FOR GENERATING DATA INTELLIGENCE

FIELD OF THE INVENTION

The present invention generally relates to the field of data management and machine learning. In particular, the present invention is directed towards apparatus and methods for generating data intelligence.

BACKGROUND

A patient in need of medical treatment may be faced with a daunting amount of risk and uncertainty. The outcome of medical treatment may depend on many factors associated with the patient, but the role of each of these factors and its impact and significance can be challenging to quantify. In some cases, prior successful cases from patients with similar profiles may be used as benchmarks to evaluate potential treatment plans, but these cases are often archived individually by their respective healthcare facilities without a structured format or easy access. These issues can become even more prominent for certain challenging medical conditions with few or no widely established treatment protocols. As a result, a patient in such situations is often left with no choice but to make uninformed decisions, which could result in a higher likelihood of negative treatment outcomes, a waste of precious treatment time, and/or excessive financial cost.

SUMMARY OF THE DISCLOSURE

In an aspect, an apparatus for generating data intelligence is described. The apparatus includes a processor and a memory communicatively connected to the processor, wherein the memory contains instructions configuring the processor to receive from a data repository a plurality of digital records, wherein each digital record of the plurality of digital records includes a plurality of reference attributes. The processor is further configured to receive query data from an entity, wherein the query data include a plurality of query attributes. The processor is further configured to identify one or more relevant digital records by matching one or more query attributes of the plurality of query attributes with one or more reference attributes of the plurality of reference attributes. The processor is further configured to generate, using an output generation machine-learning model trained on output generation training data, one or more output data structures as a function of the one or more relevant digital records. The processor is further configured to calculate one or more intelligence metrics as a function of each output data structure of the one or more output data structures, wherein at least an intelligence metric of the one or more intelligence metrics includes an estimated likelihood of positive outcome. The processor is further configured to select at least a recommended output data structure as a function of the one or more intelligence metrics.

In another aspect, a method for generating data intelligence is described. The method includes receiving, by a processor from a data repository, a plurality of digital records, wherein each digital record of the plurality of digital records includes a plurality of reference attributes. The method further includes receiving, by the processor from an entity, query data, wherein the query data include a plurality of query attributes. The method further includes identifying, by the processor, one or more relevant digital records by matching one or more query attributes of the plurality of query attributes with one or more reference attributes of the plurality of reference attributes. The method further includes generating, by the processor using an output generation machine-learning model trained on output generation training data, one or more output data structures as a function of the one or more relevant digital records. The method further includes calculating, by the processor, one or more intelligence metrics as a function of each output data structure of the one or more output data structures, wherein at least an intelligence metric of the one or more intelligence metrics includes an estimated likelihood of positive outcome. The method further includes selecting, by the processor, at least a recommended output data structure as a function of the one or more intelligence metrics.

These and other aspects and features of nonlimiting embodiments of the present invention will become apparent to those skilled in the art upon review of the following description of specific nonlimiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
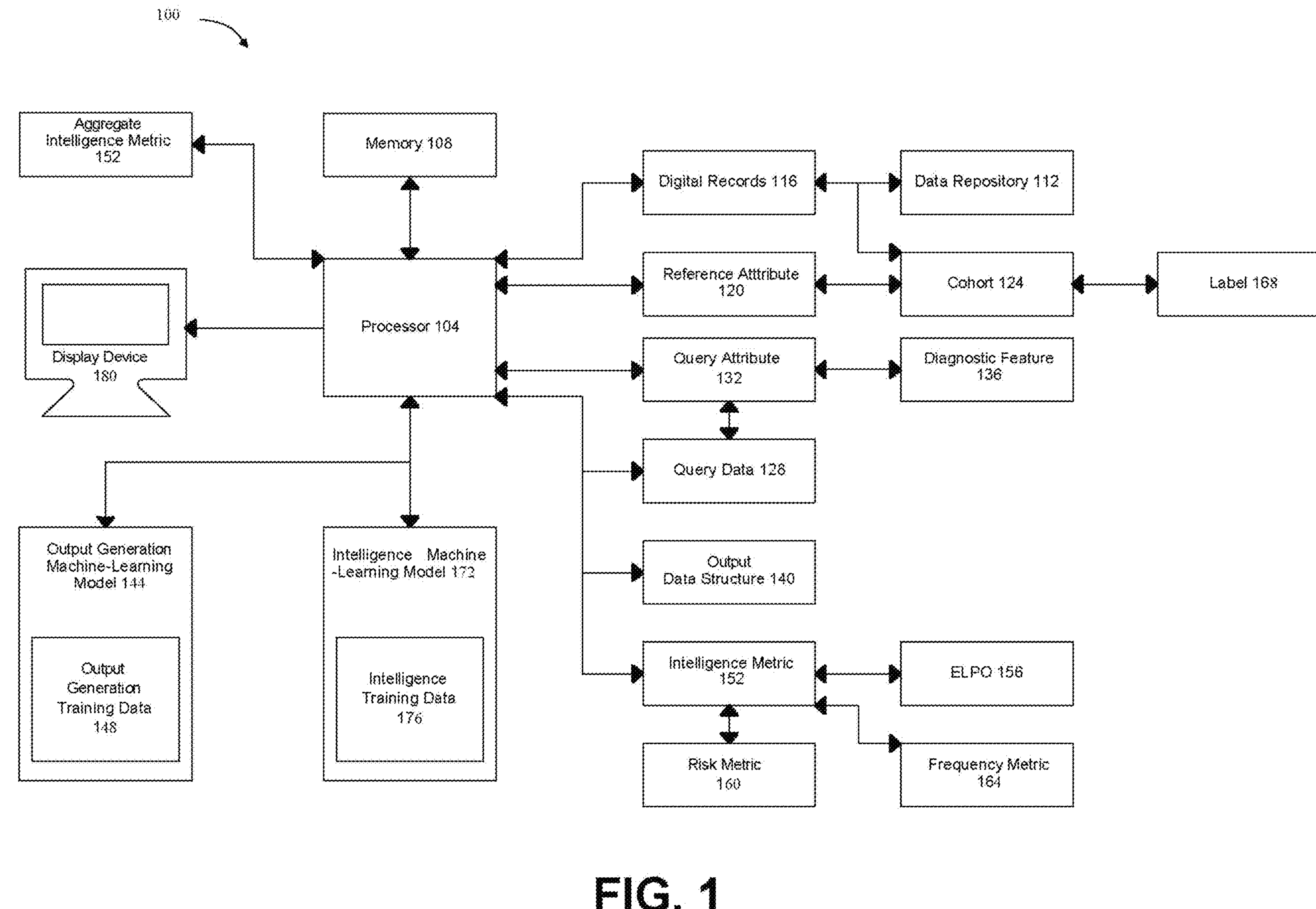
FIG. 1 is an exemplary embodiment of an apparatus for generating data intelligence.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for generating data intelligence. In one or more embodiments, in the context of healthcare, the invention described herein may be used to provide treatment intelligence with respect to a treatment plan or the like. In some cases, such treatment intelligence may be used to evaluate a newly established medical procedure with an uncertain outcome, including without limitation a clinical trial program.

The apparatus includes a processor and a memory communicatively connected to the processor, wherein the memory contains instructions configuring the processor to receive from a data repository a plurality of digital records. Each digital record of the plurality of digital records includes a plurality of reference attributes. In one or more embodiments, the plurality of digital records may include a plurality of electronic health records (EHR) pertaining to a plurality of patients. In one or more embodiments, receiving the plurality of digital records may include grouping the plurality of digital records into a plurality of cohorts, wherein each cohort of the plurality of cohorts shares one or more reference attributes.

The processor is further configured to receive query data from an entity, wherein the query data include a plurality of query attributes. In one or more embodiments, the plurality of query attributes may include at least a diagnostic feature pertaining to the entity. In one or more embodiments, the plurality of query attributes may include at least a resource attribute. In one or more embodiments, the plurality of query attributes may include at least a positional attribute.

The processor is further configured to identify one or more relevant digital records by matching one or more query attributes of the plurality of query attributes with one or more reference attributes of the plurality of reference attributes.

The processor is further configured to generate, using an output generation machine-learning model trained on output generation training data, one or more output data structures as a function of the one or more relevant digital records. In one or more embodiments, the processor may be configured to receive output generation training data including a plurality of exemplary output data structures as outputs correlated with a plurality of exemplary digital records as inputs. The processor may be configured to iteratively train the output generation machine-learning model using the output generation training data. Accordingly, the one or more output data structures may be generated using the trained output generation machine-learning model.

The processor is further configured to calculate one or more intelligence metrics as a function of each output data structure of the one or more output data structures. At least an intelligence metric of the one or more intelligence metrics includes an estimated likelihood of positive outcome. In one or more embodiments, at least an intelligence metric of the one or more intelligence metrics may include at least a risk metric. In one or more embodiments, at least an intelligence metric of the one or more intelligence metrics may include at least a frequency metric.

In one or more embodiments, calculating the one or more intelligence metrics may include labeling each output data structure of the one or more output data structures as a function of the plurality of cohorts, consistent with details described above. Accordingly, the one or more intelligence metrics may be calculated as a function of the label.

In one or more embodiments, calculating the one or more intelligence metrics may involve using an intelligence machine-learning model. Specifically, the processor may be configured to receive intelligence training data including a plurality of exemplary intelligence metrics as outputs correlated with a plurality of exemplary output data structures as inputs. The processor may be configured to iteratively train the intelligence machine-learning model using the intelligence training data, such as without limitation by adjusting a plurality of weights associated thereto. The one or more intelligence metrics may then be calculated using the intelligence machine-learning model.

The processor is further configured to select at least a recommended output data structure as a function of the one or more intelligence metrics. In one or more embodiments, selecting the at least a recommended output data structure may include calculating an aggregate intelligence metric for each output data structure of the one or more output data structures, as a function of the one or more intelligence metrics. Accordingly, selecting the at least a recommended output data structure may further include ranking the one or more output data structures as a function of the aggregate intelligence metric. As a result, the at least a recommended output data structure may be selected as a function of the rank. In one or more embodiments, selecting the at least a recommended output data structure may include identifying the at least a recommended output data structure as a function of the at least a resource attribute and/or the at least a positional attribute, consistent with details described above.

In one or more embodiments, the processor may be further configured to display, using a graphical user interface, the at least a recommended output data structure.

Aspects of the present disclosure may be used to provide insights into treatment protocols and medical procedures based on historical data. Aspects of the present disclosure may be used to create customized treatment plans with minimum human intervention. Aspects of the present disclosure may be used to increase the success rate of a medical procedure and mitigate the risk or negative impact thereof. Exemplary embodiments illustrating aspects of the present disclosure are described below in the context of several specific examples.

Referring now to FIG. 1, an apparatus 100 for generating data intelligence is illustrated. For the purposes of this disclosure, "data intelligence" is a collection of actionable insights that inform decision-making, optimize solutions, and/or improve operational efficiencies. Data intelligence may be generated based on collecting, processing, and analyzing data in a systematic manner. More specifically, a process for generating data intelligence often integrates machine learning, predictive analytics, and/or artificial intelligence, among other computational techniques, to analyze complex datasets. As a nonlimiting example, in the context of healthcare, these complex datasets may include electronic health records (EHRs), medical imaging, patient demographics, and/or clinical trial data, among others, additional details of which will be provided below in this disclosure. Accordingly, in such a context, data intelligence may be generated in the specific form of treatment intelligence. For the purposes of this disclosure, "treatment intelligence" is a specific type of data intelligence that pertains to the treatment or mitigation of a medical condition. By transforming raw data into meaningful patterns and predictions, treatment intelligence may enable healthcare providers and administrators to make evidence-based decisions, enhance treatment protocols, reduce costs, and/or improve patient outcomes, among others. In some cases, treatment intelligence may be used to evaluate one or more treatment plans in order to select the most suitable option that best fits a patient's condition, ability, and/or needs. In some cases, treatment intelligence may be used to evaluate one or more treatment plans in order to select the most suitable option with the minimum financial uncertainty and/or negative health impact. In some cases, treatment intelligence may be used to evaluate a newly established medical procedure with a potentially uncertain outcome, including without limitation a clinical trial program. In some cases, treatment intelligence may be used to evaluate one or more treatment plans in order to select the option with the highest likelihood of success. In some cases, treatment intelligence may be used to advance certain aspects of personalized medicine, population health management, and/or healthcare system optimization, among others. Details described herein pertaining to generation of data intelligence may be consistent with any detail disclosed in disclosed in U.S. patent application Ser. No. 19/057,446, filed on Feb. 19, 2025, entitled "APPARATUS AND METHODS FOR MATCHING USER DATA WITH THIRD-PARTY DATA STRUCTURES", the entirety of which is incorporated herein by reference. Additional details will be provided below in this disclosure.

With continued reference to FIG. 1, for the purposes of this disclosure, a "patient" is a human or any individual organism, on whom or on which a procedure, study, or otherwise experiment, may be conducted. As nonlimiting examples, a patient may include a human patient with symptoms of an autoimmune disease, an individual diagnosed with a neurodegenerative condition, a participant undergoing a clinical trial or willing to participate in a clinical trial, an individual with congenital heart disease, a heart transplant candidate, an individual receiving follow-up care after a surgery, a healthy volunteer, an individual with kidney failure, or the like. Additionally, and/or alternatively, a patient may include a pet such as without limitation a dog, a cat, a rabbit, a parrot, a fish, or the like. Additionally, or alternatively, a patient may include an animal model (i.e., an animal used to model certain medical conditions such as a laboratory rat).

With continued reference to FIG. 1, it is worth noting that the use of apparatus 100 may not be restricted to the context of healthcare only; in contrary, generation of treatment intelligence, while being the primary focus of discussion in this disclosure, is simply intended to serve as an exemplary embodiment of a wide variety of uses of apparatus 100. A person of ordinary skill in the art, upon reviewing the entirety of this disclosure, will be able to recognize how apparatus 100 may be applied to a boarder context of data analytics and risk management that extends beyond a healthcare context.

With continued reference to FIG. 1, apparatus 100 includes a processor 104. In one or more embodiments, processor 104 may include or be included in a computing device. Computing device may include any analog or digital control circuit, including an operational amplifier circuit, a combinational logic circuit, a sequential logic circuit, an application-specific integrated circuit (ASIC), a field programmable gate arrays (FPGA), or the like. Computing device may include a processor communicatively connected to a memory, as described above. Computing device may include any computing device as described in this disclosure, including without limitation a microcontroller, microprocessor, digital signal processor, and/or system on a chip as described in this disclosure. Computing device may include, be included in, and/or communicate with a mobile device such as a mobile telephone, smartphone, or tablet. Computing device may include a single computing device operating independently, or may include two or more computing devices operating in concert, in parallel, sequentially, or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a first computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a nonlimiting example, using a "shared nothing" architecture.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. A person of ordinary skill in the art, upon reviewing the entirety of this disclosure, will be aware of various ways in which steps, sequences of steps, processing tasks, and/or data may be subdivided, shared, or otherwise dealt with using iteration, recursion, and/or parallel processing. More details regarding computing devices will be described below.

With continued reference to FIG. 1, apparatus 100 includes a memory 108 communicatively connected to processor 104, wherein the memory 108 contains instructions configuring the processor 104 to perform any processing steps described herein. For the purposes of this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween.

Data and/or signals therebetween may include, without limitation, electrical, electromagnetic, magnetic, video, audio, radio, and microwave data and/or signals, combinations thereof, and/or the like. A communicative connection may be achieved, for example and without limitation, through wired or wireless electronic, digital, or analog, communication, either directly or by way of one or more intervening devices or components. Further, a communicative connection may include electrically coupling or connecting at least an output of one device, component, or circuit to at least an input of another device, component, or circuit, for example, and without limitation, using a bus or other facility for intercommunication between elements of a computing device. Communicative connecting may also include indirect connections via, for example and without limitation, wireless connection, radio communication, low-power wide-area network, optical communication, magnetic, capacitive, or optical coupling, and the like. In some instances, the terminology "communicatively coupled" may be used in place of communicatively connected in this disclosure.

With continued reference to FIG. 1, computing device may perform determinations, classification, and/or analysis steps, methods, processes, or the like as described in this disclosure using machine-learning processes. For the purposes of this disclosure, a "machine-learning process" is a process that automatically uses a body of data known as "training data" and/or a "training set" to generate an algorithm that will be performed by a processor module to produce outputs given data provided as inputs. This is in contrast to a non-machine-learning software program where the commands to be executed are determined in advance by a user and written in a programming language. A machine-learning process may utilize supervised, unsupervised, lazy-learning processes and/or neural networks. More details regarding computing devices and machine-learning processes will be provided below.

With continued reference to FIG. 1, apparatus 100 may include or be communicatively connected to a data repository 112. For the purposes of this disclosure, a "data repository" is a centralized storage location where large volumes of data are collected, managed, and/or maintained for future retrieval, analysis, or distribution. A data repository can be a physical or virtual location used to store structured, semi-structured, or unstructured data. Data repositories are commonly used in scientific research, healthcare, business, and IT for securely storing data from various sources, making it easily accessible for analysis, reporting, or sharing. Nonlimiting examples of data repositories may include databases, data warehouses, and/or cloud storage solutions, among others. For the purposes of this disclosure, a "database" is an organized collection of data or a type of data store based on the use of a database management system (DBMS), the software that interacts with end users, applications, and the database itself to capture and analyze the data. A database may be implemented, without limitation, as a relational database, a key-value retrieval database such as a NoSQL database, or any other format or structure for use as database that a person of ordinary skill in the art would recognize as suitable upon review of the entirety of this disclosure. A database may alternatively, or additionally, be implemented using a distributed data storage protocol and/or data structure, such as a distributed hash table or the like. A database may include a plurality of data entries and/or records as described in this disclosure. Data entries in a database may be flagged with or linked to one or more additional elements of information, which may be reflected in data entry cells and/or in linked tables such as tables related by one or more indices in database or another relational database. A person of ordinary skill in the art, upon reviewing the entirety of this disclosure, will be aware of various ways in which data entries in database may store, retrieve, organize, and/or reflect data and/or records as used herein, as well as categories and/or populations of data consistently with this disclosure.

With continued reference to FIG. 1, in some cases, processor 104 may be configured to query a database by searching within the database for a match. As a nonlimiting example, when a database includes a SQL database, processor 104 may be configured to submit one or more SQL queries to interact with the database. To retrieve data, a "SELECT" statement may be used to specify one or more columns, rows, table names, and/or the like, and optional conditions may be applied using WHERE clauses. In some cases, a DBMS may use indexes, if available, to quickly locate relevant rows and columns, ensuring accurate and efficient data retrieval. Once SQL queries are executed using a DBMS interface or code, results may be returned for further steps.

With continued reference to FIG. 1, processor 104 is configured to receive from data repository 112 a plurality of digital records 116. For the purposes of this disclosure, a "digital record" is a digital file, or a collection of digital files, pertaining to data generated or recorded in the past. In one or more embodiments, in the context of healthcare, digital record 116 may include patient data from prior treatment plan(s) and treatment outcome(s) associated thereto, as described in further detail below. Digital record 116 may contain data of any relevant format. In one or more embodiments, digital record 116 may include textual data such as without limitation electronic notes, logs, or reports, online chat history, emails, text messages, and/or the like. In one or more embodiments, digital record 116 may include audio data such as without limitation a recording of a conversation, a consulting session, an instruction, a therapeutic procedure, a telehealth session, a verbal consent by a patient, and/or the like. In one or more embodiments, digital record 116 may include visual data such as without limitation a scanned image of a prescription or a doctor's note, an image of a prescription bottle, an image of a wound or infection, an X-ray image, a computed tomography (CT) scan, a magnetic resonance imaging (MRI) scan, an echocardiogram, an electrocardiogram, and/or the like. In one or more embodiments, digital record 116 may include video data such as a video recording of a surgical procedure or a diagnostic evaluation. For the purposes of this disclosure, a "digital file" is an electronic data unit stored in a computer-readable format. A digital file may be designed to encapsulate various types of information, including without limitation text, images, audio, video, and/or the like, as described above. A digital file may include without limitation a .doc file, a .docx file, a .ppt file, a .pptx file, a .pdf file, a .png file, a .jpeg file, a .html file, a .proto file, and/or the like.

With continued reference to FIG. 1, in one or more embodiments, plurality of digital records 116 may include or be included in a plurality of electronic health records (EHR) pertaining to a plurality of patients. For the purposes of this disclosure, an "electronic health record (EHR)" is a comprehensive collection of records relating to the health history, diagnosis, or condition of a patient, relating to treatment provided or proposed to be provided to the patient, or relating to additional factors that may impact the health of the patient. Elements within an EHR, once combined, may provide a detailed picture of a patient's overall health. In one or more embodiments, an EHR may include demographic data and/or personal information of a patient. As nonlimiting examples, an EHR may include basic information about a patient such as name, age, gender, race, occupation, ethnicity, marital status, annual household income, socioeconomic status, insurance policy (including policy number for identification) or insurance coverage, disability status, residential address, emergency contact, and/or the like. In one or more embodiments, an EHR may also include time-correlated data such as without limitation a patient's medical history. As nonlimiting examples, an EHR may include a detailed record of a patient's past health conditions, medical procedures, hospitalizations, and illnesses such as surgeries, treatments, medications, allergies, and/or the like. In one or more embodiments, an EHR may include or specify the types of medications or therapies used, the cost associated thereto, the span or duration of treatment, the level of difficulty or challenge, and/or the like. In one or more embodiments, a plurality of EHRs may be combined to generate insights regarding treatment outcomes, such as without limitation success rates, failure rates, common side effects, and/or the like. This step may be implemented via certain statistical methods, as described in further detail below in this disclosure. In one or more embodiments, an EHR may include lifestyle information of a user. As nonlimiting examples, an EHR may include details about the patient's diet, daily calorie intake, exercise habits, smoking and alcohol consumption, use of recreational drugs, and/or other behaviors that could impact a user's health. In one or more embodiments, an EHR may include a patient's family history. As a nonlimiting example, an EHR may include a record of hereditary diseases. In one or more embodiments, an EHR may be retrieved from a database or a repository of similar nature as a database, e.g., data repository 112. Details regarding data repositories and databases have been provided above in this disclosure.

With continued reference to FIG. 1, each digital record 116 of plurality of digital records 116 includes a plurality of reference attributes 120. For the purposes of this disclosure, a "reference attribute" is an attribute against which another attribute may be compared and evaluated in order to make a determination and/or initiate one or more subsequent processing steps. For the purpose of this disclosure, an "attribute" is a data element describing one or more features pertaining to one or more aspects of a collection of data as well as one or more parties associated thereto. As nonlimiting examples, in the context of healthcare, an attribute may include or refer to the name, sex/gender, age, weight, and/or one or more medical conditions and/or risk factors, among others, of a patient, consistent with details described above in this disclosure with respect to EHRs.

With continued reference to FIG. 1, in one or more embodiments, receiving plurality of digital records 116 may include grouping the plurality of digital records 116 into a plurality of cohorts 124, wherein each cohort 124 of the plurality of cohorts 124 shares one or more reference attributes 120. These cohorts 124 may be used in one or more processing steps of apparatus 100, of which additional details will be provided below in this disclosure. In some cases, in the same context of healthcare, digital records 116 may be classified based on their associated medical conditions, as specified by one or more reference attributes 120. As a nonlimiting example, digital records 116 pertaining to cases of stage III lung cancer may be selected and aggregated to create a cohort 124. In some cases, in the same context of healthcare, digital records 116 may be classified based on the demographic information of the patients, as specified by one or more reference attributes 120. As a nonlimiting example, digital records 116 pertaining to patients over 65 years old may be selected and aggregated to form a cohort 124. In some cases, in the context of healthcare, digital records 116 may be classified based on their associated success rates and/or the like, as a function of one or more cutoffs. These cutoffs may be arbitrarily set by an entity/apparatus 100, such as without limitation as a function of existing standards, rules, or regulations, or determined empirically based on a statistical analysis of digital records 116. As a nonlimiting example, a cluster of digital records 116 within the top 20% in terms of success rates may be selected and aggregated to create a cohort 124. In some cases, creation of cohorts 124 may involve a use of fuzzy set comparison or a technique similar thereto, as described in further detail below in this disclosure.

With continued reference to FIG. 1, in some cases, reference attributes 120 within cohort 124 may be combined and tallied to form a statistical model. For the purposes of this disclosure, a "statistical model" is a mathematical representation, usually based on certain statistical assumptions, that describes the behavior of one or more variables in probabilistic terms. A statistical model may be described by one or more numerical indicators such as without limitation an average or mean, a median, a standard deviation, a variance, a range, or the like. "Statistical model" and "statistical distribution" may be used interchangeably throughout this disclosure. In some cases, a statistical model may be updated when its associated cohort 124 or cohorts 124 are filtered into one or more sub-cohorts as a function of one or more inclusion/exclusion criteria.

With continued reference to FIG. 1, processor 104 is further configured to receive query data 128 from an entity. For the purposes of this disclosure, "query data" are data used as a query in order to retrieve one or more matching results and/or initiate one or more subsequent processing steps. Query data 128 may be directly or indirectly provided by a user or entity. Query data 128 may include any type of data described above pertaining to digital records 116 and/or reference attributes 120. Additionally, and/or alternatively, query data 128 may include any type of data recognized by a person of ordinary skill in the art, upon reviewing the entirety of this disclosure. For the purposes of this disclosure, an "entity" is an individual (a natural person), a group of individuals, a corporate or organization, a department or division within a corporate or organization, or otherwise any subject or party capable of utilizing or interacting with apparatus 100. As a nonlimiting example, within the context of healthcare, an entity may include without limitation a patient or group of patients (e.g., a family or household), a customer or group of customers, or one or more caretakers, emergency contacts, guardians, or legal representatives thereof, among others. As another nonlimiting example, within the same context, an entity may include without limitation a clinic including one or more divisions therein, a hospital including one or more departments therein, an insurance company expected to cover the medical cost of a patient based on an insurance policy in place, a doctor, a nurse practitioner, a nurse, a surgeon, an anesthesiologist, a radiologist, a specialist, a practitioner, a front desk clerk, a support staff member, and/or the like. In some cases, the terms "entity" and "user" may be used interchangeably throughout this disclosure.

With continued reference to FIG. 1, query data 128 include a plurality of query attributes 132. For the purposes of this disclosure, a "query attribute" is an attribute, as described above, that is capable of being used as a query in order to retrieve one or more matching results and/or initiating one or more subsequent processing steps. In one or more embodiments, in the context of healthcare, plurality of query attributes 132 may include at least a diagnostic feature 136 pertaining to the entity. For the purposes of this disclosure, a "diagnostic feature" is data element setting forth and/or describing one or more aspects of a medical condition associated with a patient. Diagnostic feature 136 may include or otherwise specify a medical condition, such as without limitation a case of cancer, a case of an autoimmune disease (e.g., lupus, multiple sclerosis and/or the like), a case of a genetic disorder, a case of chronic illnesses (e.g., diabetes, cardiovascular diseases, and/or the like), and/or a case of a neurodegenerative condition (e.g., Alzheimer's disease, Parkinson's disease, and/or the like), among others. Additionally, diagnostic feature 136 may include or otherwise specify one or more specific characteristics of a medical condition, such as the time of inception, stage of the medical condition (e.g., stage zero, I, II, III, or IV of cancer), record of relapse(s) and remission(s), average/peak level of severity, among others. Apparatus 100 may accordingly identify suitable treatment plans or resources as a function of diagnostic feature 136, as described in detail below in this disclosure.

With continued reference to FIG. 1, in one or more embodiments, plurality of query attributes 132 may include at least a resource attribute. For the purposes of this disclosure, a "resource attribute" is an attribute, as described above, that specifies one or more aspects of one or more supports or resources available or accessible to an entity. In some cases, in the context of healthcare, a resource attribute may include or specify an amount of monetary resource (i.e., a budget) that a patient is willing and/or able to commit in order to undergo or complete a certain procedure or treatment, which may include without limitation a clinical trial program of a new drug or type of treatment. In some cases, a resource attribute may include or specify an extent of coverage or support based on an insurance policy. An insurance policy may include information such as without limitation policy holder information, premium, coverage details, copays/coinsurance, deductibles, out-of-pocket maximum, exclusions and limitations, network information (e.g., details regarding in-network and out-of-network providers), preauthorization and referrals, claim submission process, add-ons, legal rights and responsibilities, and/or privacy and data use, among others. In some cases, in the same context, a resource attribute may include or specify the amount of available time per week, month, quarter, or year, to engage with a particular treatment plan. In some cases, in the same context, a resource attribute may include or specify the availability of a caregiver, such as without limitation a nurse, a chauffeur, and/or the like.

With continued reference to FIG. 1, in one or more embodiments, plurality of query attributes 132 may include at least a positional attribute. For the purposes of this disclosure, a "positional attribute" is an attribute, as details described above, pertaining to the location of a user, party, or entity. In one or more embodiments, a positional attribute may include a location pertaining to an entity, such as without limitation a residential address of a patient or a location at which a patient is being treated or hospitalized, among others. In some cases, a positional attribute may include a combination of longitude and latitude, an address, a street name, a city/county/state name, a zip code, and/or the like. In some cases, a positional attribute may be used to filter available treatment plans and isolate the portion thereof within a certain accessible geographical region, consistent with details disclosed in U.S. patent application Ser. No. 19/057,446 and/or otherwise described elsewhere in this disclosure. As a nonlimiting example, a positional attribute may specify a location of Cleveland, OH, which may be used as a reference to selectively retrieve all available and applicable medical resources within a 50-mile radius.

With continued reference to FIG. 1, processor 104 is further configured to identify one or more relevant digital records 116 by matching one or more query attributes 132 of plurality of query attributes 132 with one or more reference attributes 120 of the plurality of reference attributes 120. In one or more embodiments, certain aspects of this step may be implemented in a binary manner, such as without limitation by applying certain inclusion/exclusion criteria. These inclusion/exclusion criteria may be specified by an entity based on their preference or configured by apparatus 100 upon proper initialization. As a nonlimiting example, when one or more query attributes 132 and/or diagnostic features 136 specify that query data 128 pertains to a 28-year-old female patient diagnosed with ovarian cancer, and a first reference attribute 120 of a first digital record 116 indicates that the first digital record 116 pertains to a 35-year-old female diagnosed with ovarian cancer, the first digital record 116 may accordingly be deemed a relevant digital record 116. Continuing the same nonlimiting example, in contrast, when one or more query attributes 132 and/or diagnostic features 136 specify that query data 128 pertains to a 28-year-old female patient diagnosed with ovarian cancer, and a second reference attribute 120 of a second digital record 116 indicates that the second digital record 116 pertains to a 75-year-old male diagnosed with prostate cancer, the second digital record 116 may accordingly be deemed an irrelevant digital record 116, as the medical conditions of the two profiles do not match. In some cases, certain query attributes 132 and/or diagnostic features 136 may be deemed crucial (i.e., with limited or no flexibility), either by an entity or by apparatus 100, in order for the apparatus 100 to produce reliable outputs. As a result, exact match(es) to such query attributes 132 and/or diagnostic features 136 may be necessary.

With continued reference to FIG. 1, in one or more embodiments, one or more relevant digital records 116 may be identified by calculating a relevance score on a continuous scale. For the purposes of this disclosure, a "relevance score" is a numerical indication describing how a first data element resembles or otherwise relates to a second data element. In some cases, a relevance score with a larger or more positive numerical value may indicate a more relevant digital record 116, whereas a relevance score with a smaller or more negative numerical value may indicate a less relevant digital record 116 instead. As a nonlimiting example, if 8 of 10 query attributes have matching reference attributes 120 in a third digital record 116, then a relevance score may accordingly be determined as 80% or 8/10 for the third digital record 116. As another nonlimiting example, if 3 of 10 query attributes have matching reference attributes 120 in a fourth digital record 116, then a relevance score may accordingly be determined as 30% or 3/10 for the fourth digital record 116. Accordingly, one or more relevant digital records 116 may be selected as a function of such a relevance score, as a function of a relevance threshold. For the purposes of this disclosure, a "relevance threshold" is a numerical indication that marks the division between relevant and irrelevant digital records 116. In some cases, relevance threshold may include a minimum numerical value or a maximum numerical value. Continuing the same nonlimiting example described above, a relevance threshold may be set at 60%, i.e., a relevance score must be at least 60% for a digital record 116 to be considered relevant; accordingly, the third digital record 116 with a relevance score of 80% may be deemed relevant, whereas the fourth digital record 116 with a relevance score of 30% may be deemed irrelevant instead. A relevance threshold may be either specified by an entity or determined by apparatus 100. In some cases, a relevance threshold may be determined based on historical data, such as without limitation historical records of treatment outcomes. In some cases, relevance threshold may be determined, updated, and/or dynamically adjusted, consistent with details described elsewhere in this disclosure. Accordingly, upon a modification of a relevance threshold, results pertaining to relevant digital records 116 may be accordingly expanded or condensed.

With continued reference to FIG. 1, in one or more embodiments, one or more machine-learning models may be used to perform certain function or functions of apparatus 100, such as without limitation identification of one or more relevant digital records 116, as described above, generation of output data structures, as described below, and/or calculation of one or more intelligence metrics, as described below. Processor 104 may use a machine-learning module to implement one or more algorithms as described herein or generate one or more machine-learning models, such as without limitation an output generation machine-learning model, an intelligence machine-learning model, etc., as described below. However, machine-learning module is exemplary and may not be necessary to generate one or more machine-learning models and perform any machine learning described herein. In one or more embodiments, one or more machine-learning models may be generated using training data. Training data may include inputs and corresponding predetermined outputs so that machine-learning model may use correlations between the provided exemplary inputs and outputs to develop an algorithm and/or relationship that then allows the machine-learning model to determine its own outputs for inputs. Training data may contain correlations that a machine-learning process may use to model relationships between two or more categories of data elements. Exemplary inputs and outputs may be retrieved from a database, selected from one or more EHRs, or provided by an entity. In one or more embodiments, machine-learning module may obtain training data by querying a communicatively connected database that includes past inputs and outputs. Training data may include inputs from various types of databases, resources, and/or user inputs and outputs correlated to each of those inputs, so that machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a nonlimiting example, training data may include data entered in standardized forms by persons or processes, such that entry of a given data element in a given field in a form may be mapped to one or more descriptors of categories. Elements in training data may be linked to descriptors of categories by tags, tokens, or other data elements. In one or more embodiments, training data may include previous outputs such that one or more machine-learning models may iteratively produce outputs.

With continued reference to FIG. 1, in one or more embodiments, apparatus 100 may perform certain aspects of its function or functions, such as without limitation identification of one or more relevant digital records 116 and/or the like, using a large language model (LLM). An LLM may be trained using a large set of training examples. In some cases, training an LLM may include first pre-training the LLM on a general set of training examples (e.g., a collection of journal articles in the past two decades) and fine-tuning the LLM on a special set of training examples (e.g., a collection of cancer-related research findings in the past three years), wherein both the general set of training examples and the special set of training examples are subsets of the large set of training examples. For the purposes of this disclosure, a "large language model" is a deep learning data structure that can recognize, summarize, translate, predict and/or generate text and other content based on knowledge gained from massive datasets. LLMs may be trained on large sets of data. Training sets may be drawn from diverse sets of data such as, as nonlimiting examples, scientific journal articles, medical report documents, EHRs, entity documents, business documents, inventory documentation, emails, user communications, advertising documents, newspaper articles, and the like. In some embodiments, training sets of an LLM may include information from one or more public or private databases. As a nonlimiting example, training sets may include databases associated with an entity. In some embodiments, training sets may include portions of documents associated with the electronic records correlated to examples of outputs. In one or more embodiments, LLM may include one or more architectures based on capability requirements of the LLM. Exemplary architectures may include, without limitation, Generative Pretrained Transformer (GPT), Bidirectional Encoder Representations from Transformers (BERT), Text-To-Text Transfer Transformer (T5), and the like. Architecture choice may depend on a needed capability, such as without limitation generative, contextual, or other specific capabilities.

With continued reference to FIG. 1, in one or more embodiments, LLM may be generally trained. For the purposes of this disclosure, a "generally trained" LLM is a LLM that is trained on a general training set comprising a variety of subject matters, datasets, and fields. In one or more embodiments, LLM may be initially generally trained. Additionally, or alternatively, LLM may be specifically trained. For the purposes of this disclosure, a "specifically trained" LLM is a LLM that is trained on a specific training set, wherein the specific training set includes data including specific correlations for the LLM to learn. As a nonlimiting example, LLM may be generally trained on a general training set, then specifically trained on a specific training set. In one or more embodiments, generally training LLM may be performed using unsupervised machine-learning process. In one or more embodiments, specific training of LLM may be performed using supervised machine-learning process. As a nonlimiting example, specific training set may include information from a database. As a nonlimiting example, specific training set may include text related to the users such as user specific data for electronic records correlated to examples of outputs. In one or more embodiments, training one or more machine-learning models may include setting the parameters of the one or more models (weights and biases) either randomly or using a pretrained model. Generally training one or more machine-learning models on a large corpus of text data can provide a starting point for fine-tuning on a specific task. A model such as LLM may learn by adjusting its parameters during the training process to minimize a defined loss function, which measures the difference between predicted outputs and ground truth. Once model has been generally trained, the model may then be specifically trained to fine-tune the pretrained model on task-specific data to adapt it to the target task. Fine-tuning may involve training model with task-specific training data, adjusting the model's weights to optimize performance for the particular task. In some cases, this may include optimizing model's performance by fine-tuning hyperparameters such as learning rate, batch size, and regularization. Hyperparameter tuning may help in achieving the best performance and convergence during training. In one or more embodiments, fine-tuning pretrained model such as LLM may include fine-tuning the pretrained model using Low-Rank Adaptation (LoRA). For the purposes of this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in one or more embodiments, LLM may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. LLM may include a text prediction-based algorithm configured to receive an article and apply a probability distribution to the words already typed in a sentence to work out the most likely word to come next in augmented articles. For example, if some words that have already been typed are "electronic health", then it may be highly likely that the word "record" will come next. LLM may output such predictions by ranking words by likelihood or a prompt parameter. For the example given above, LLM may score "record" as the most likely, "records" as the next most likely, "profile" or "profiles" next, and the like. LLM may include an encoder component and a decoder component.

With continued reference to FIG. 1, LLM may include a transformer architecture. In some embodiments, encoder component of LLM may include transformer architecture. For the purposes of this disclosure, a "transformer architecture" is a neural network architecture that uses self-attention and positional encoding. Transformer architecture may be designed to process sequential input data, such as natural language, with applications towards tasks such as translation and text summarization. Transformer architecture may process the entire input all at once. For the purposes of this disclosure, "positional encoding" is a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, LLM and/or transformer architecture may include an attention mechanism. For the purposes of this disclosure, an "attention mechanism" is a part of a neural network architecture that enables a system to dynamically quantify relevant features of the input data. In the case of natural language processing, input data may be a sequence of textual elements. It may be applied directly to the raw input or to its higher-level representation.

With continued reference to FIG. 1, attention mechanism may represent an improvement over a limitation of an encoder-decoder model. An encoder-decoder model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying attention mechanism, LLM may predict next word by searching for a set of positions in a source sentence where the most relevant information is concentrated. LLM may then predict next word based on context vectors associated with these source positions and all the previously generated target words, such as textual data of a dictionary correlated to a prompt in a training dataset. For the purposes of this disclosure, "context vectors" are fixed-length vector representations useful for document retrieval and word sense disambiguation.

With continued reference to FIG. 1, attention mechanism may include, without limitation, generalized attention, self-attention, multi-head attention, additive attention, global attention, and the like. In generalized attention, when a sequence of words or an image is fed to LLM, it may verify each element of input sequence and compare it against the output sequence. Each iteration may involve the mechanism's encoder capturing input sequence and comparing it with each element of the decoder's sequence. From the comparison scores, attention mechanism may then select the words or parts of image that it needs to pay attention to. In self-attention, LLM may pick up particular parts at different positions in input sequence and over time compute an initial composition of output sequence. In multi-head attention, LLM may include a transformer model of an attention mechanism. Attention mechanisms, as described above, may provide context for any position in input sequence. For example, if the input data is a natural-language sentence, the transformer does not have to process one word at a time. In multi-head attention, computations by LLM may be repeated over several iterations, and each computation may form parallel layers known as attention heads. Each separate head may independently pass input sequence and corresponding output sequence element through separate head. A final attention score may be produced by combining attention scores at each head so that every nuance of input sequence is taken into consideration. In additive attention (Bahdanau attention mechanism), LLM may make use of attention alignment scores based on a number of factors. Alignment scores may be calculated at different points in neural network, and/or at different stages represented by discrete neural networks. Source or input sequence words are correlated with target or output sequence words but not to an exact degree. This correlation may take into account all hidden states and the final alignment score is the summation of a matrix of alignment scores. In global attention (Luong mechanism), in situations where neural machine translations are required, LLM may either attend to all source words or predict the target sentence, thereby attending to a smaller subset of words.

With continued reference to FIG. 1, multi-headed attention in encoder may apply a specific attention mechanism called self-attention. Self-attention allows models such as LLM or components thereof to associate each word in input, to other words. As a nonlimiting example, LLM may learn to associate the word "you", with "how" and "are". It's also possible that LLM learns that words structured in this pattern are typically a question and to respond appropriately. In one or more embodiments, to achieve self-attention, input may be fed into three distinct and fully connected neural network layers to create query, key, and value vectors. Query, key, and value vectors may be fed through a linear layer; then, the query and key vectors may be multiplied using dot product matrix multiplication in order to produce a score matrix. Score matrix may determine the amount of focus for a word that should be put on other words (thus, each word may be a score that corresponds to other words in the time-step). The values in score matrix may be scaled down. As a nonlimiting example, score matrix may be divided by the square root of the dimension of the query and key vectors. In one or more embodiments, a softmax of the scaled scores in score matrix may be taken. The output of this softmax function may be called attention weights. Attention weights may be multiplied by your value vector to obtain an output vector, wherein the output vector may then be fed through a final linear layer.

With continued reference to FIG. 1, in order to use self-attention in a multi-headed attention computation, query, key, and value may be split into N vectors before applying self-attention. Each self-attention process may be called a "head". Each head may produce an output vector and each output vector from each head may be concatenated into a single vector. This single vector may then be fed through final linear layer discussed above. In theory, each head can learn something different from input, therefore giving the encoder model more representation power.

With continued reference to FIG. 1, encoder of transformer may include a residual connection. Residual connection may include adding the output from multi-headed attention to the positional input embedding. In one or more embodiments, an output from residual connection may go through a layer normalization. In one or more embodiments, a normalized residual output may be projected through a pointwise feed-forward network for further processing. Pointwise feed-forward network may include a couple of linear layers with a ReLU activation in between. Output may then be added to an input of the pointwise feed-forward network and further normalized.

With continued reference to FIG. 1, transformer architecture may include a decoder. Decoder may include a multi-headed attention layer, a pointwise feed-forward layer, one or more residual connections, and layer normalization (particularly after each sub-layer), as discussed in more detail above. In one or more embodiments, decoder may include two multi-headed attention layers. In one or more embodiments, decoder may be autoregressive. For the purposes of this disclosure, "autoregressive" means that the decoder takes in a list of previous outputs as inputs along with encoder outputs containing attention information from the input.

With continued reference to FIG. 1, in one or more embodiments, input to decoder may go through an embedding layer and positional encoding layer to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a nonlimiting example, when computing attention scores on the word "am", decoder should not have access to the word "fine" in "I am fine", because that word is a future word that was generated after. The word "am" should only have access to itself and the words before it. In one or more embodiments, this may be accomplished by implementing a look-ahead mask. Look ahead mask is a matrix of the same dimensions as a scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when a softmax of this matrix is taken, negative infinities will be zeroed out; this leaves zero attention scores for "future tokens."

With continued reference to FIG. 1, second multi-headed attention layer may use encoder outputs as queries and keys and outputs from the first multi-headed attention layer as values. This process matches encoder's input to the decoder's input, allowing the decoder to decide which encoder input is relevant to put a focus on. An output from second multi-headed attention layer may be fed through a pointwise feedforward layer for further processing.

With continued reference to FIG. 1, an output of the pointwise feedforward layer may be fed through a final linear layer. This final linear layer may act as a classifier. This classifier may be as big as the number of classes that you have. For example, if you have 10,000 classes for 10,000 words, output of that classifier will be of size 10,000. Output of this classifier may be fed into a softmax layer which may serve to produce probability scores between zero and one. An index may be taken of the highest probability score in order to determine a predicted word.

With continued reference to FIG. 1, decoder may take this output and add it to decoder inputs. Decoder may continue decoding until a token is predicted. Decoder may stop decoding once it predicts an end token.

With continued reference to FIG. 1, in one or more embodiments, decoder may be stacked N layers high, with each layer taking in inputs from encoder and layers before it. Stacking layers may allow LLM to learn to extract and focus on different combinations of attention from its attention heads.

With continued reference to FIG. 1, LLM may receive an input. Input may include a string of one or more characters. Inputs may additionally include unstructured data. For example, input may include one or more words, a sentence, a paragraph, a thought, a query, and the like. For the purposes of this disclosure, a "query" is a string of characters that poses a question. In one or more embodiments, input may be received from a user device. User device may be any computing device that is used by a user. As nonlimiting examples, user device may include desktops, laptops, smartphones, tablets, and the like. In one or more embodiments, input may include any set of data associated with training and/or using LLM. As a nonlimiting example, input may be a prompt such as "what is the general success rate of medical procedure X based on historical data?"

With continued reference to FIG. 1, LLM may generate at least one annotation as output. At least one annotation may be any annotation as described herein. In one or more embodiments, LLM may include multiple sets of transformer architecture as described above. Output may include a textual output. For the purposes of this disclosure, "textual output" is an output comprising a string of one or more characters. Textual output may include, for example, a plurality of annotations for unstructured data. In one or more embodiments, textual output may include a phrase or sentence identifying the status of a user query. In one or more embodiments, textual output may include a sentence or plurality of sentences describing a response to user query. As a nonlimiting example, this may include restrictions, timing, advice, dangers, benefits, and the like.

With continued reference to FIG. 1, processor 104 is further configured to generate one or more output data structures 140 as a function of one or more relevant digital records 116. For the purposes of this disclosure, an "output data structure" is a data structure generated by apparatus 100 as an output targeted towards a user or entity. For the purposes of this disclosure, a "data structure" is a format of data organization, management, and storage that is usually chosen for efficient access to data. Output data structure 140 may include any suitable type of data structure recognized by a person of ordinary skill in the art, upon reviewing the entirety of this disclosure, such as without limitation, stack, queue, array, list, or tree. In some cases, in the context of healthcare, output data structure 140 may include comprehensive and structured information pertaining to potential modes and means of treatment, such as without limitation the type(s) of prescription(s) used, including without limitation the dosage and/or the method of delivery thereof, among others; the types of therapy used, including without limitation the associated instrumentation, frequency, intensity, planning, timeline, and/or the like, of its implementation. In some cases, in the same context of healthcare, output data structure 140 may reproduce information as is, without any significant tweaking or modification, from one or more relevant digital records 116 that are deemed exact matches to query data 128. In some cases, output data structure 140 may include synthetic data or data structures generated based on an analysis of relevant digital records 116. As a nonlimiting example, output data structure 140 may specify a potential treatment plan by populating a hypothetical digital record 116 (e.g., of a hypothetical patient profile or the like) with the statistical mean, the median, the mode, or the like, of parameters within relevant digital records 116.

With continued reference to FIG. 1, processor 104 is configured to generate one or more output data structures using an output generation machine-learning model 144 trained on output generation training data 148. In one or more embodiments, processor 104 may be configured to receive output generation training data 148 including a plurality of exemplary output data structures as outputs correlated with a plurality of exemplary digital records as inputs. Processor 104 may be configured to iteratively train output generation machine-learning model 144 using the output generation training data 148. Accordingly, one or more output data structures 140 may be generated using such trained output generation machine-learning model 144. Implementation of output generation machine-learning model 144 may be consistent with any type of machine-learning model or algorithm described in this disclosure. In one or more embodiments, output generation training data 148 may include data or records specifically synthesized for training purposes using one or more generative models. In one or more embodiments, prior query data 128 and/or one or more elements therein may be incorporated into output generation training data 148 upon proper validation. In one or more embodiments, output generation training data 148 may be retrieved from one or more databases and/or other repositories of similar nature (e.g., data repository 112) or be supplied as one or more inputs from one or more users or entities. In one or more embodiments, at least a portion of output generation training data 148 may be added, deleted, replaced, or otherwise updated as a function of one or more inputs from one or more entities. A person of ordinary skill in the art, upon reviewing the entirety of this disclosure, will be able to recognize suitable means to implement output generation machine-learning model 144 in apparatus 100.

With continued reference to FIG. 1, processor 104 is further configured to calculate one or more intelligence metrics 152 as a function of each output data structure 140 of one or more output data structures 140. For the purposes of this disclosure, an "intelligence metric" is an indication describing or evaluating one or more aspects of output data structure 140. An intelligence metric may provide insights regarding how an output data structure 140 aligns with the need of an entity, based on information specified in query data 128. An intelligence metric may include or be implemented using any means or format deemed relevant or suitable by a person of ordinary skill in the art, upon reviewing the entirety of this disclosure. In one or more embodiments, intelligence metric 152 may include a numerical indication on a discrete or continuous scale, such as without limitation an 8/10 or 80%. In one or more embodiments, intelligence metric 152 may include descriptive and/or categorical indications such as without limitation "high", "medium", "low", "mandatory", "optional", and/or the like. These possible embodiments may also apply to specific types of intelligence metrics 152 as outlined below in this disclosure without limitation.

With continued reference to FIG. 1, at least an intelligence metric 152 of one or more intelligence metrics 152 includes an estimated likelihood of positive outcome (ELPO) 156. For the purposes of this disclosure, an "estimated likelihood of positive outcome" or "ELPO" is an indication pertaining to the probability of an output data structure 140 in achieving or producing a desired result. In some cases, in the context of healthcare, ELPO 156 may include a success rate of a prescription, therapy, treatment, and/or the like, consistent with details described elsewhere in this disclosure without limitation.

With continued reference to FIG. 1, in one or more embodiments, at least an intelligence metric 152 of one or more intelligence metrics 152 may include at least a risk metric 160. For the purposes of this disclosure, a "risk metric" is an indication describing the probability of an output data structure 140 in resulting in an undesired, deleterious, and/or detrimental outcome. In some cases, in the context of healthcare, risk metric 160 may include or specify a probability, in a numerical, categorical, or descriptive manner, of a negative treatment outcome, such as without limitation a case of excessive medical cost, unexpected allergy, severe side effect, paralysis, coma, death, etc.

With continued reference to FIG. 1, in one or more embodiments, at least an intelligence metric 152 of one or more intelligence metrics 152 may include at least a frequency metric 164. For the purposes of this disclosure, a "frequency metric" is an indication describing how frequently a process or procedure is used applied. In some cases, frequency metric 164 may be used to indicate the number of occurrences for a process or procedure within a fixed amount of time, such as without limitation within a day, week, month, quarter, year, or decade, among others. In some cases, in the context of healthcare, frequency metric 164 may be used to describe how frequently a prescription, a medical procedure, a treatment protocol, and/or the like, is applied in a clinical context. In some cases, frequency metric 164 may be a reflection of whether a process is advanced (e.g., requiring intricate instrumentation and/or specialized training) or basic (e.g., well-established and/or relatively easy to deploy) in terms of technical difficulty. As a nonlimiting example, a frequency metric assigned with a low numerical value may indicate that a process is an unpopular choice among medical professionals and/or still under development (e.g., at an experimental stage). Such capability of apparatus 100 may enable an entity to make informed decisions when evaluating various options of output data structures 140.

With continued reference to FIG. 1, in one or more embodiments, calculating one or more intelligence metrics 152 may include labeling each output data structure 140 of one or more output data structures 140 as a function of cohorts 124 of digital records 116 associated thereto, consistent with details described above. Accordingly, one or more intelligence metrics 152 may be calculated as a function of label 168. For the purposes of this disclosure, "labeling" is a process of identifying data elements within a dataset and adding one or more meaningful and informative labels 168 to provide a context for one or more following steps. For the purposes of this disclosure, a "label" is an indication describing one or more characteristics of a subject matter as well as how the subject matter may be categorized into one or more categories with respect to a population or sub-population containing the subject. In one or more embodiments, label 168 may include a binary label, e.g., "normal" vs. "abnormal" or "included" vs. "not included". In one or more embodiments, label 168 may be further specified, such as without limitation "abnormally large", "abnormally small", "abnormally high", and/or "abnormally low", among others. In one or more embodiments, label 168 may be associated with a percentile ranking, e.g., "top 10% of all digital records". In one or more embodiments, label 168 may be applied with respect to at least a specific cohort 124 upon application of one or more inclusion/exclusion criteria, such as "top 25% of digital records 116 associated with female patients". In some cases, labeling one or more output data structures 140 may include analyzing the statistical distribution of plurality of digital records 116 and/or one or more parameters therein, consistent with details described above in this disclosure.

With continued reference to FIG. 1, in one or more embodiments, calculating one or more intelligence metrics 152 may involve using an intelligence machine-learning model 172. Specifically, processor 104 may be configured to receive intelligence training data 176 including a plurality of exemplary intelligence metrics as outputs correlated with a plurality of exemplary output data structures as inputs. Processor 104 may be configured to iteratively train intelligence machine-learning model 172 using the intelligence training data 176, such as without limitation by adjusting a plurality of weights associated thereto, as described in further detail below in this disclosure. One or more intelligence metrics 152 may then be calculated using intelligence machine-learning model 172. Implementation of intelligence machine-learning model 172 may be consistent with any type of machine-learning model or algorithm described in this disclosure. In one or more embodiments, intelligence training data 176 may include data specifically synthesized for training purposes using one or more generative models. In one or more embodiments, one or more historical query data 128 and/or one or more elements therein may be incorporated into intelligence training data 176 upon proper validation. In one or more embodiments, intelligence training data 176 may be retrieved from one or more databases and/or other repositories of similar nature (e.g., data repository 112) or be supplied as one or more inputs from one or more users or entities. In one or more embodiments, at least a portion of intelligence training data 176 may be added, deleted, replaced, or otherwise updated as a function of one or more inputs from one or more entities. A person of ordinary skill in the art, upon reviewing the entirety of this disclosure, will be able to recognize suitable means to implement intelligence machine-learning model 172 in apparatus 100.

With continued reference to FIG. 1, processor 104 is further configured to select at least a recommended output data structure 140 as a function of one or more intelligence metrics 152. For the purposes of this disclosure, a "recommended output data structure" is an output data structure 140, as described above, deemed by apparatus 100 as potentially suitable for an entity based on previously described processing steps. In one or more embodiments, selecting at least a recommended output data structure 140 may include calculating an aggregate intelligence metric 152 for each output data structure 140 of one or more output data structures 140, as a function of one or more intelligence metrics 152. In some cases, such aggregation process may be implemented by computing a weighted average of plurality of intelligence metrics as a function of a plurality of correlated weighing factors, via any suitable means as recognized by a person of ordinary skill in the art, upon reviewing the entirety of this disclosure. Accordingly, selecting at least a recommended output data structure 140 may further include ranking one or more output data structures 140 as a function of aggregate intelligence metric 152. As a nonlimiting example, an output data structure 140 associated with a high aggregate intelligence metric 152 may be ranked towards the top of a list, whereas an output data structure 140 associated with a low aggregate intelligence metric 152 may be ranked towards the bottom of the list instead. As a result, at least a recommended output data structure 140 may be selected as a function of the rank.

With continued reference to FIG. 1, in one or more embodiments, selecting at least a recommended output data structure 140 may include identifying the at least a recommended output data structure 140 as a function of at least a resource attribute and/or at least a positional attribute, consistent with details described above. This step may be implemented by applying one or more inclusion/exclusion criteria, consistent with details described above.

With continued reference to FIG. 1, apparatus 100 may include or be communicatively connected to a display device 180. For the purposes of this disclosure, a "display device" is a device configured to show visual information. In some cases, display device 180 may include a liquid crystal display (LCD), a cathode ray tube (CRT), a plasma display, a light emitting diode (LED) display, and any combinations thereof. Display device 180 may include, but is not limited to, a smartphone, tablet, laptop, monitor, tablet, and the like. Display device 180 may include a separate device that includes a transparent screen configured to display computer-generated images and/or information. In one or more embodiments, display device 180 may be configured to visually present data through a user interface or a graphical user interface (GUI) to at least a user, wherein the user may interact with the data through the user interface or GUI, as described below. In one or more embodiments, a user may view GUI through display device 180. In one or more embodiments, display device 180 may be located on a remote device, as described below. Additional details will be provided below in this disclosure through nonlimiting examples.

With continued reference to FIG. 1, display device 180 may include a remote device. For the purposes of this disclosure, a "remote device" is a computer device separate and distinct from apparatus 100. For example, and without limitation, a remote device may include a smartphone, a tablet, a laptop, a desktop computer, or the like. In one or more embodiments, a remote device may be communicatively connected to apparatus 100 such as, for example, through network communication, through Bluetooth communication, and/or the like. In one or more embodiments, processor 104 may receive query data 128 and/or initiate one or more of subsequent steps through a remote device. In one or more embodiments, one or more inputs from one or more users may be submitted through a user interface, such as a GUI, displayed using a remote device, as described below.

With continued reference to FIG. 1, in one or more embodiments, apparatus 100 may further include a user interface. In one or more embodiments, processor 104 may be configured to display, using a user interface, at least a recommended output data structure 140, consistent with details described above. For the purposes of this disclosure, a "user interface" is a means by which a user and a computer system interact, for example, using input devices and software. A user interface may include a graphical user interface (GUI), command line interface (CLI), menu-driven user interface, touch user interface, voice user interface (VUI), form-based user interface, any combination thereof, or the like. In one or more embodiments, a user may interact with a user interface using computing device distinct from and communicatively connected to apparatus 100 and/or processor 104, such as a smartphone, tablet, or the like operated by the user. A user interface may include one or more graphical locator and/or cursor facilities allowing user to interact with graphical models and/or combinations thereof, for instance using a touchscreen, touchpad, mouse, keyboard, and/or other manual data entry device. For the purposes of this disclosure, a "graphical user interface (GUI)" is a type of user interface that allows end users to interact with electronic devices through visual representations. In one or more embodiments, a GUI may include icons, menus, other visual indicators or representations (graphics), audio indicators such as primary notation, display information, and related user controls. A menu may contain a list of choices and may allow users to select one from them. A menu bar may be displayed horizontally across the screen as a pull-down menu. A menu May include a context menu that appears only when a user performs a specific action. Files, programs, web pages, and the like may be represented using a small picture within a GUI. In one or more embodiments, a GUI may include a graphical visualization of a user profile and/or the like. In one or more embodiments, processor 104 may be configured to modify and/or update a GUI as a function of at least an input or the like by populating a user interface data structure and visually presenting data through modification of the GUI.

With continued reference to FIG. 1, in one or more embodiments, a GUI may contain one or more interactive elements. For the purposes of this disclosure, an "interactive element" is an element within a GUI that allows for communication with processor 104 by one or more users. For example, and without limitation, interactive elements may include a plurality of tabs wherein selection of a particular tab, such as for example, by using a fingertip, may indicate to a system to perform a particular function and display the result through a GUI. In one or more embodiments, interactive elements may include tabs within a GUI, wherein the selection of a particular tab may result in a particular function. In one or more embodiments, interactive elements may include words, phrases, illustrations, and the like, to indicate a particular process that one or more users would like a system to perform. A person of ordinary skill in the art, upon reviewing the entirety of this disclosure, will be aware of various ways in which user interfaces, GUIs, and/or elements thereof may be implemented and/or used as described in this disclosure.

With continued reference to FIG. 1, in one or more embodiments, display device 180 and/or remote device may be configured to display at least an event handler graphic corresponding to at least an event handler. For the purposes of this disclosure, an "event handler graphic" is a graphical element with which user interacts using display device 180 and/or remote device to enter data, such as without limitation query data 128 or the like as described above. Exemplary event handler graphics may include, without limitation, a button, a link, a checkbox, a text entry box and/or window, a drop-down list, a slider, or any other event handler graphic deemed suitable by a person of ordinary skill in the art upon reviewing the entirety of this disclosure. For the purposes of this disclosure, an "event handler" is a module, data structure, function, and/or routine that performs an action on display device 180 and/or remote device in response to one or more user inputs. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. An event handler may generate prompts for further information, may compare data to validation rules such as requirements that the data in question be entered within certain numerical ranges, and/or may modify data and/or generate warnings to user in response to such requirements. An event handler may convert data into expected and/or desired formats, such as date formats, currency entry formats, name formats, or the like. An event handler may transmit data from a remote device to apparatus 100, processor 104, and/or computing device.

With continued reference to FIG. 1, in one or more embodiments, an event handler may include a cross-session state variable. For the purposes of this disclosure, a "cross-session state variable" is a variable recording data entered on remote device during a previous session. Such data may include, for instance, previously entered text, previous selections of one or more elements as described above, or the like. For instance, cross-session state variable data may represent a search that user entered in a past session. Cross-session state variable may be saved using any suitable combination of client-side data storage on a remote device and server-side data storage on a computing device; for instance, data may be saved wholly or in part as a "cookie" which may include data or an identification of remote device to prompt provision of cross-session state variable by the computing device, which may store the data on the computing device. Alternatively, or additionally, a computing device may use login credentials, device identifier, and/or device fingerprint data to retrieve cross-session state variable, which the computing device may transmit to remote device. Cross-session state variable may include at least a prior session datum. A prior session datum may include any element of data that may be stored in cross-session state variable. An event handler graphic may be further configured to display at least a prior session datum, for example and without limitation, by auto-populating user query data from previous sessions.

With continued reference to FIG. 1, in one or more embodiments, processor 104 and/or computing device may configure display device 180 and/or remote device to generate a graphical view. For the purposes of this disclosure, a "graphical view" is a data structure that results in display of one or more graphical elements on a screen. A graphical view may include at least a display element. For the purposes of this disclosure, a "display element" is an image that a program and/or data structure cause to be displayed. Display elements may include, without limitation, windows, pop-up boxes, web browser pages, display layers, and/or any other display element deemed relevant by a person of ordinary skill in the art upon reviewing the entirety of this disclosure. A graphical view may include at least a selectable event graphic corresponding to one or more selectable event handlers. For the purposes of this disclosure, a "selectable event graphic" is a graphical element that, upon selection, will trigger an action to be performed. Selection may be performed using a cursor or other locator as manipulated using a locator device such as a mouse, touchscreen, track pad, joystick, or the like. As a nonlimiting example, a selectable event graphic may include a redirection link. For the purposes of this disclosure, a "redirection link" is a hyperlink, button, image, portion of an image, and/or other graphic containing or referring to a uniform resource locator (URL) and/or other resource locator to another graphical view including without limitation buttons, and/or to a process that performs navigation to such URL and/or other resource locator upon selection of a selectable event graphic. Redirection may be performed using any event handler, including without limitation event handlers detecting the click of a mouse or other locator, access of redirection link using a touchscreen, the selection of any key, mouseover events, or the like.

With continued reference to FIG. 1, in one or more embodiments, processor 104 may perform one or more functions of apparatus 100 by using optical character recognition (OCR) to read digital files and extract information therein. In one or more embodiments, OCR may include automatic conversion of images (e.g., typed, handwritten, or printed text) into machine-encoded text. In one or more embodiments, recognition of at least a keyword from an image component may include one or more processes, including without limitation OCR, optical word recognition, intelligent character recognition, intelligent word recognition, and the like. In one or more embodiments, OCR may recognize written text one glyph or character at a time, for example, for languages that use a space as a word divider. In one or more embodiments, intelligent character recognition (ICR) may recognize written text one glyph or character at a time, for instance by employing machine-learning processes. In one or more embodiments, intelligent word recognition (IWR) may recognize written text, one word at a time, for instance by employing machine-learning processes.

With continued reference to FIG. 1, in one or more embodiments, OCR may employ preprocessing of image components. Preprocessing process may include without limitation de-skew, de-speckle, binarization, line removal, layout analysis or "zoning", line and word detection, script recognition, character isolation or "segmentation", and normalization. In one or more embodiments, a de-skew process may include applying a transform (e.g., homography or affine transform) to an image component to align text. In one or more embodiments, a de-speckle process may include removing positive and negative spots and/or smoothing edges. In one or more embodiments, a binarization process may include converting an image from color or greyscale to black-and-white (i.e., a binary image). Binarization may be performed as a simple way of separating text (or any other desired image component) from the background of image component. In one or more embodiments, binarization may be required for example if an employed OCR algorithm only works on binary images. In one or more embodiments, line removal process may include removal of non-glyph or non-character imagery (e.g., boxes and lines). In one or more embodiments, a layout analysis or "zoning" process may identify columns, paragraphs, captions, and the like as distinct blocks. In one or more embodiments, a line and word detection process may establish a baseline for word and character shapes and separate words, if necessary. In one or more embodiments, a script recognition process may, for example in multilingual documents, identify a script, allowing an appropriate OCR algorithm to be selected. In one or more embodiments, a character isolation or "segmentation" process may separate signal characters, for example, character-based OCR algorithms. In one or more embodiments, a normalization process may normalize the aspect ratio and/or scale of image component.

With continued reference to FIG. 1, in one or more embodiments, an OCR process may include an OCR algorithm. Exemplary OCR algorithms include matrix-matching processes and/or feature extraction processes. Matrix matching may involve comparing an image to a stored glyph on a pixel-by-pixel basis. In one or more embodiments, matrix matching may also be known as "pattern matching", "pattern recognition", and/or "image correlation". Matrix matching may rely on an input glyph being correctly isolated from the rest of image component. Matrix matching may also rely on a stored glyph being in a similar font and at the same scale as input glyph.

With continued reference to FIG. 1, in one or more embodiments, an OCR process may include a feature extraction process. In one or more embodiments, feature extraction may decompose a glyph into features. Exemplary nonlimiting features may include corners, edges, lines, closed loops, line direction, line intersections, and the like. In one or more embodiments, feature extraction may reduce the dimensionality of representation and may make the recognition process computationally more efficient. In one or more embodiments, extracted features can be compared with an abstract vector-like representation of a character, which might be reduced to one or more glyph prototypes. General techniques of feature detection in computer vision are applicable to this type of OCR. In one or more embodiments, machine-learning process like nearest neighbor classifiers (e.g., k-nearest neighbors algorithm) can be used to compare image features with stored glyph features and choose a nearest match. OCR may employ any machine-learning process described in this disclosure. Exemplary nonlimiting OCR software includes Cuneiform and Tesseract. Cuneiform is a multi-language, open-source OCR system originally developed by Cognitive Technologies of Moscow, Russia. Tesseract is a free OCR software originally developed by Hewlett-Packard of Palo Alto, California, United States.

With continued reference to FIG. 1, in one or more embodiments, OCR may employ a two-pass approach to character recognition. Second pass may include adaptive recognition and use letter shapes recognized with high confidence on a first pass to better recognize remaining letters on a second pass. In one or more embodiments, two-pass approach may be advantageous for unusual fonts or low-quality image components where visual verbal content may be distorted. Another exemplary OCR software tool includes OCRopus. The development of OCRopus is led by the German Research Center for Artificial Intelligence in Kaiserslautern, Germany. In one or more embodiments, OCR software may employ neural networks, for example, deep neural networks, as described in this disclosure below.

With continued reference to FIG. 1, in one or more embodiments, OCR may include post-processing. For example, OCR accuracy can be increased, in some cases, if output is constrained by a lexicon. A lexicon may include a list or set of words that are allowed to occur in a document. In one or more embodiments, a lexicon may include, for instance, all the words in the English language, or a more technical lexicon for a specific field. In some cases, an output stream may be a plain text stream or file of characters. In one or more embodiments, an OCR may preserve an original layout of visual verbal content. In one or more embodiments, near-neighbor analysis can make use of co-occurrence frequencies to correct errors by noting that certain words are often seen together. For example, "Washington, D.C." is generally far more common in English than "Washington DOC". In one or more embodiments, an OCR process may make use of a priori knowledge of grammar for a language being recognized. For example, OCR process may apply grammatical rules to help determine if a word is likely to be a verb or a noun. Distance conceptualization may be employed for recognition and classification. For example, a Levenshtein distance algorithm may be used in OCR post-processing to further optimize results. A person of ordinary skill in the art will recognize how to apply the aforementioned technologies to extract information from a digital file upon reviewing the entirety of this disclosure.

With continued reference to FIG. 1, in one or more embodiments, a computer vision module configured to perform one or more computer vision tasks such as, without limitation, object recognition, feature detection, edge/corner detection thresholding, or machine-learning process may be used to recognize specific features or attributes. For the purposes of this disclosure, a "computer vision module" is a computational component designed to perform one or more computer vision, image processing, and/or modeling tasks. In one or more embodiments, computer vision module may receive one or more digital records 116 containing one or more reference attributes 120 from data repository 112 and generate one or more labels 168 as a function of the received one or more reference attributes 120, consistent with details described above in this disclosure.

With continued reference to FIG. 1, in one or more embodiments, computer vision module may include an image processing module, wherein images may be pre-processed using the image processing module. For the purposes of this disclosure, an "image processing module" is a component designed to process digital images such as images described herein. For example, and without limitation, image processing module may be configured to compile a plurality of images of a multi-layer scan to create an integrated image. In one or more embodiments, image processing module may include a plurality of software algorithms that can analyze, manipulate, or otherwise enhance an image, such as, without limitation, a plurality of image processing techniques as described below. In one or more embodiments, computer vision module may also include hardware components such as, without limitation, one or more graphics processing units (GPUs) that can accelerate the processing of a large number of images. In one or more embodiments, computer vision module may be implemented with one or more image processing libraries such as, without limitation, OpenCV, PIL/Pillow, ImageMagick, and the like. In a nonlimiting example, in order to generate one or more labels and/or recognize one or more reference attributes, one or more image processing tasks, such as noise reduction, contrast enhancement, intensity normalization, image segmentation, and/or the like, may be performed by computer vision module on a plurality of images to isolate certain features or components from the rest. In one or more embodiments, one or more machine-learning models may be used to perform segmentations, for example, and without limitation, a U-net (i.e., a convolution neural network containing a contracting path as an encoder and an expansive path as a decoder, wherein the encoder and the decoder forms a U-shaped structure). A person of ordinary skill in the art, upon reviewing the entirety of this disclosure, will be aware of various image processing, computer vision, and modeling tasks that may be performed by processor 104.

With continued reference to FIG. 1, in one or more embodiments, one or more functions of apparatus 100 may involve a use of image classifiers to classify images within any data described in this disclosure. For the purposes of this disclosure, an "image classifier" is a machine-learning model that sort inputs of image information into categories or bins of data, outputting the categories or bins of data and/or labels associated therewith. Image classifier may include a mathematical model, a neural net, or a program generated by a machine-learning algorithm known as a "classification algorithm", as described in further detail below. Image classifier may be configured to output at least a datum that labels or otherwise identifies a set of images that are clustered together, found to be close under a distance metric as described below, or the like. Computing device and/or another device may generate image classifier using a classification algorithm. For the purposes of this disclosure, a "classification algorithm" is a process whereby computing device derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, Fisher's linear discriminant, quadratic classifiers, decision trees, boosted trees, random forest classifiers, learning vector quantization, and/or neural network-based classifiers. In one or more embodiments, processor 104 may use image classifier to identify a key image in any data described in this disclosure. For the purposes of this disclosure, a "key image" is an element of visual data used to identify and/or match elements to each other. In one or more embodiments, key image may include part of a medical image such as a CT scan, an MRI scan, or the like, with features that unambiguously identify the type of the medical image. Image classifier may be trained with binarized visual data that have already been classified to determine key images in any other data described in this disclosure. For the purposes of this disclosure, "binarized visual data" are visual data that are described in a binary format. For example, binarized visual data of a photo may comprise ones and zeroes, wherein the specific sequence of ones and zeros may be used to represent the photo. Binarized visual data may be used for image recognition wherein a specific sequence of ones and zeroes may indicate a product present in the image. An image classifier may be consistent with any classifier as discussed herein. An image classifier may receive input data (e.g., query data 128) described in this disclosure and output a key image with the data. In one or more embodiments, image classifier may be used to compare visual data in one dataset with visual data in another dataset, as described below.

With continued reference to FIG. 1, processor 104 may be configured to perform feature extraction on one or more images, as described below. For the purposes of this disclosure, "feature extraction" is a process of transforming an initial dataset into informative measures and values. For example, feature extraction may include a process of determining one or more geometric features of a structure. In one or more embodiments, feature extraction may be used to determine one or more spatial relationships within a drawing that may be used to uniquely identify one or more features. In one or more embodiments, processor 104 may be configured to extract one or more regions of interest, wherein the regions of interest may be used to extract one or more features using one or more feature extraction techniques.

With continued reference to FIG. 1, processor 104 may be configured to perform one or more of its functions, such as extraction of query attributes 132 and/or reference attributes 120, as described above, using a feature learning algorithm. For the purposes of this disclosure, a "feature learning algorithm" is a machine-learning algorithm that identifies associations between elements of data in a dataset where particular outputs and/or inputs are not specified. Dataset may include without limitation a training dataset. As a nonlimiting example, a feature learning algorithm may detect co-occurrences of elements of data, as defined above, with each other. Computing device may perform feature learning algorithm by dividing elements or sets of data into various sub-combinations of such data to create new elements of data and evaluate which elements of data tend to co-occur with which other elements. In one or more embodiments, feature learning algorithm may perform clustering of data.

With continued reference to FIG. 1, feature learning and/or clustering algorithm may be implemented, as a non-limiting example, using a k-means clustering algorithm. For the purposes of this disclosure, a "k-means clustering algorithm" is a type of cluster analysis that partitions n observations or unclassified cluster data entries into k clusters in which each observation or unclassified cluster data entry belongs to the cluster with the nearest mean. For the purposes of this disclosure, "cluster analysis" is a process that includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering, whereby each observation or unclassified cluster data entry belongs to a cluster or not. Cluster analysis may include soft clustering or fuzzy clustering, whereby each observation or unclassified cluster data entry belongs to each cluster to a certain degree such as for example a likelihood of belonging to a cluster; for instance, and without limitation, a fuzzy clustering algorithm may be used to identify clustering of elements of a first type or category with elements of a second type or category, and vice versa, as described below. Cluster analysis may include strict partitioning clustering, whereby each observation or unclassified cluster data entry belongs to exactly one cluster. Cluster analysis may include strict partitioning clustering with outliers, whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering, whereby observations or unclassified cluster data entries that belong to a child cluster also belong to a parent cluster.

With continued reference to FIG. 1, computing device may generate a k-means clustering algorithm by receiving unclassified data and outputting a definite number of classified data entry clusters, wherein the data entry clusters each contain cluster data entries. K-means algorithm may select a specific number of groups or clusters to output, identified by a variable "k". Generating k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, which may be utilized to select a k value. Centroids of k-groups or k-cluster include a collection of feature values which are utilized to classify data entry clusters containing cluster data entries. K-means clustering algorithm may act to identify clusters of closely related data, which may be provided with user cohort labels; this may, for instance, generate an initial set of user cohort labels from an initial set of data, and may also, upon subsequent iterations, identify new clusters to be provided new labels, to which additional data may be classified, or to which previously used data may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids ci of centroids in set C. Unclassified data may be assigned to a cluster based on $\mathrm{ar}\,gmin_{ci \ni C}\,\mathrm{dist}(ci, x)^2$, where argmin includes argument of the minimum, ci includes a collection of centroids in a set C, and dist includes standard Euclidean distance. K-means clustering module may then recompute centroids by taking a mean of all cluster data entries assigned to a centroid's cluster. This may be calculated based on $ci=1/|Si|\Sigma xi\ni Si^{xi}$. K-means clustering algorithm may continue to repeat these calculations until a stopping criterion has been satisfied such as when cluster data entries do not change clusters, the sum of the distances have been minimized, and/or some maximum number of iterations has been reached.

With continued reference to FIG. 1, k-means clustering algorithm may be configured to calculate a degree of similarity index value. For the purposes of this disclosure, a "degree of similarity index value" is a distance measured between each data entry cluster generated by k-means clustering algorithm and a selected element. Degree of similarity index value may indicate how close a particular combination of elements is to being classified by k-means algorithm to a particular cluster. K-means clustering algorithm may evaluate the distances of the combination of elements to the k-number of clusters output by k-means clustering algorithm. Short distances between an element of data and a cluster may indicate a higher degree of similarity between the element of data and a particular cluster. Longer distances between an element and a cluster may indicate a lower degree of similarity between the element to be compared and/or clustered and a particular cluster.

With continued reference to FIG. 1, k-means clustering algorithm selects a classified data entry cluster as a function of the degree of similarity index value. In one or more embodiments, k-means clustering algorithm may select a classified data entry cluster with the smallest degree of similarity index value indicating a high degree of similarity between an element and the data entry cluster. Alternatively, or additionally, k-means clustering algorithm may select a plurality of clusters having low degree of similarity index values to elements to be compared and/or clustered thereto, indicative of greater degrees of similarity. Degree of similarity index values may be compared to a threshold number indicating a minimal degree of relatedness suitable for inclusion of a set of element data in a cluster, where degree of similarity indices a-n falling under the threshold number may be included as indicative of high degrees of relatedness. The above-described illustration of feature learning using k-means clustering is included for illustrative purposes only and should not be construed as limiting potential implementation of feature learning algorithms; a person of ordinary skills in the art, upon reviewing the entirety of this disclosure, will be aware of various additional or alternative feature learning approaches, such as particle swarm optimization (PSO) and generative adversarial network (GAN) that may be used consistently with this disclosure.

With continued reference to FIG. 1, in one or more embodiments, processor 104 may use an image recognition algorithm to determine patterns within an image. In one or more embodiments, image recognition algorithm may include an edge-detection algorithm, which may detect one or more shapes defined by edges. For the purposes of this disclosure, an "edge detection algorithm" is or includes a mathematical method that identifies points in a digital image at which the image brightness changes sharply and/or has discontinuities. In one or more embodiments, such points may be organized into straight and/or curved line segments, which may be referred to as "edges". Edge detection may be performed using any suitable edge detection algorithm, including without limitation Canny edge detection, Sobel operator edge detection, Prewitt operator edge detection, Laplacian operator edge detection, and/or differential edge detection. Edge detection may include phase congruency-based edge detection, which finds all locations of an image where all sinusoids in the frequency domain, for instance when generated using a Fourier decomposition, may have matching phases which may indicate a location of an edge.

Figure 2:
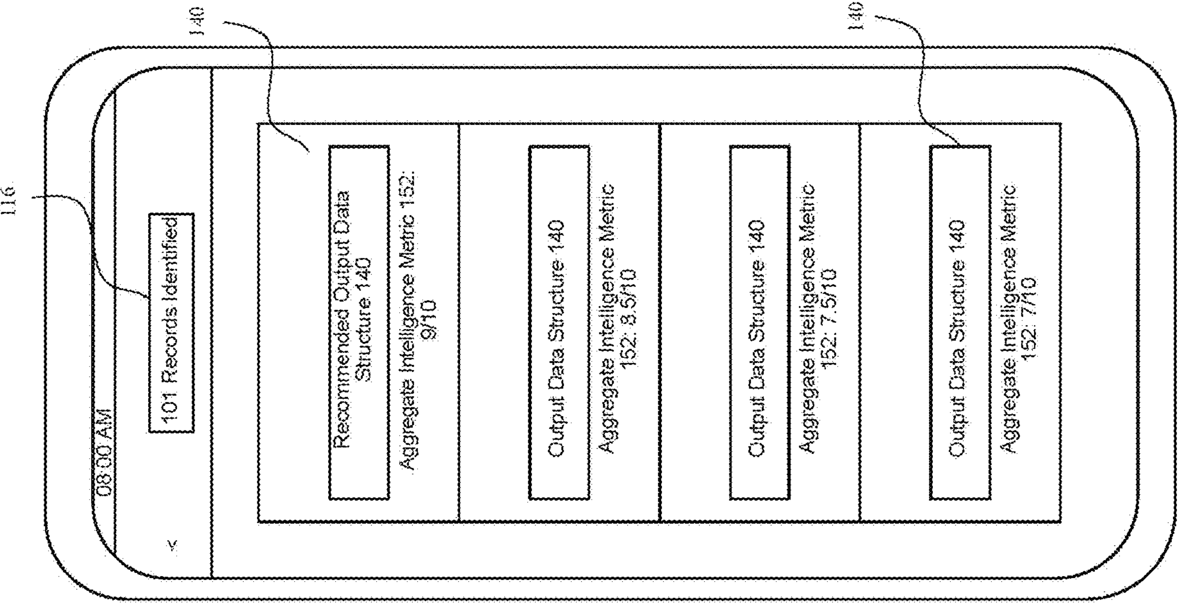
FIG. 2 is an exemplary embodiment of a user interface.
Figure 2:
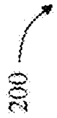

Referring now to FIG. 2, an exemplary embodiment of a user interface 200 is illustrated. User interface 200 includes a plurality of relevant digital records 116 identified based on query data 128. User interface 200 further includes a plurality of output data structures 140 ranked as a function of aggregate intelligence metric 152 (e.g., in a descending order). User interface 200 may further include estimated likelihood of positive outcome (ELPO) 156, risk metric 160, and frequency metric 164 pertaining to each output data structure 140 (not shown). Recommended output data structure 140 is indicated accordingly.

Figure 3:
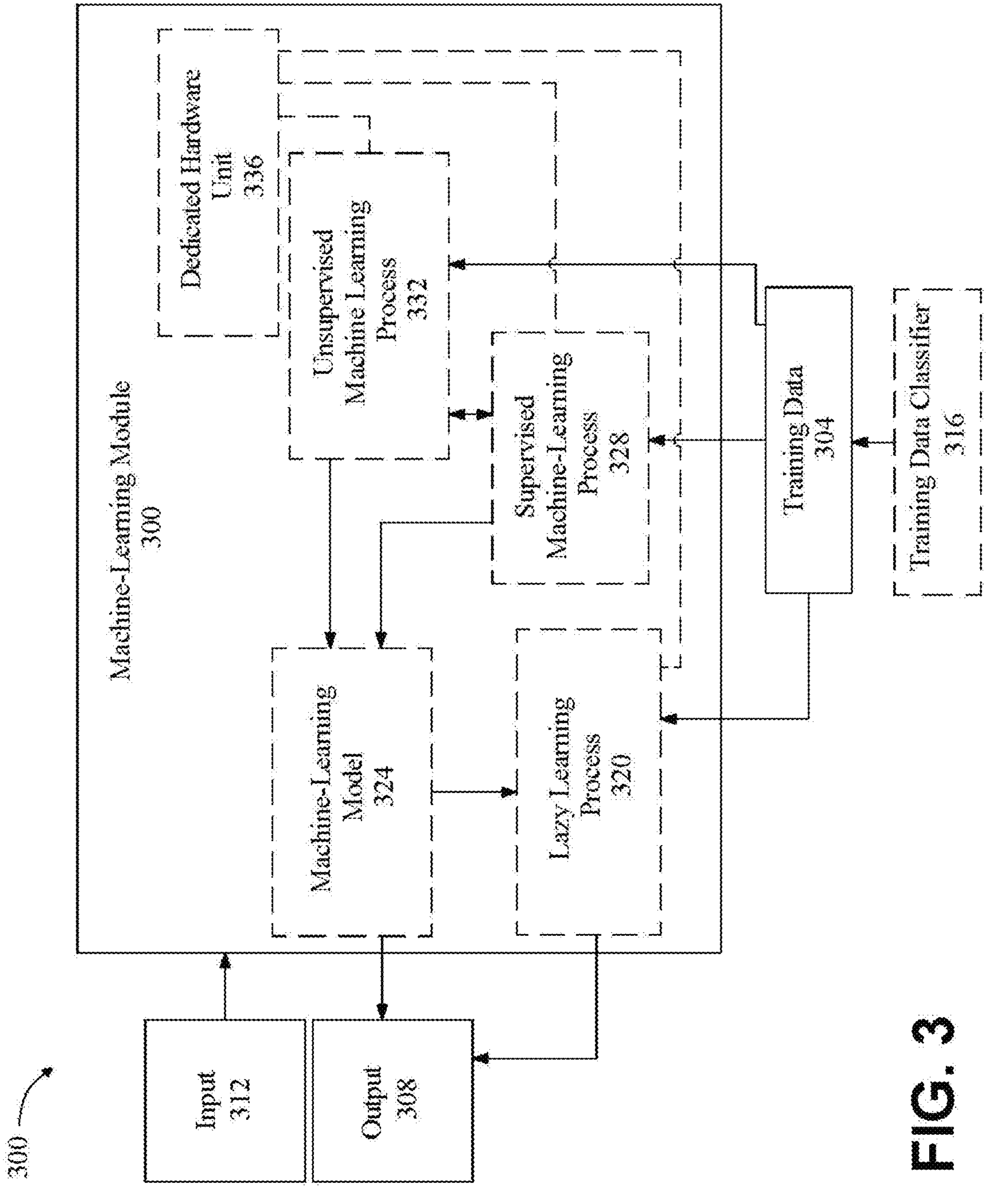
FIG. 3 is a block diagram of an exemplary embodiment of a machine-learning process.

Referring now to FIG. 3, an exemplary embodiment of a machine-learning module 300 that may perform one or more machine-learning processes as described above is illustrated. Machine-learning module 300 may perform determinations, classification, and/or analysis steps, methods, processes, or the like as described in this disclosure using machine-learning processes. For the purposes of this disclosure, a "machine-learning process" is an automated process that uses training data 304 to generate an algorithm instantiated in hardware or software logic, data structures, and/or functions that will be performed by a computing device/module to produce outputs 308 given data provided as inputs 312. This is in contrast to a non-machine-learning software program where the commands to be executed are predetermined by user and written in a programming language.

With continued reference to FIG. 3, for the purposes of this disclosure, "training data" are data containing correlations that a machine-learning process uses to model relationships between two or more categories of data elements. For instance, and without limitation, training data 304 may include a plurality of data entries, also known as "training examples", each entry representing a set of data elements that were recorded, received, and/or generated together. Data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a nonlimiting example, training data 304 may include data entered in standardized forms by persons or processes, such that entry of a given data element within a given field in a given form may be mapped to one or more descriptors of categories. Elements in training data 304 may be linked to descriptors of categories by tags, tokens, or other data elements. For instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

With continued reference to FIG. 3, alternatively, or additionally, training data 304 may include one or more elements that are uncategorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data, and the like; categories may be generated using correlation and/or other processing algorithms. As a nonlimiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a nonlimiting illustrative example, inputs may include plurality of digital records, whereas outputs may include plurality output data structures, consistent with details described above in this disclosure.

With continued reference to FIG. 3, training data 304 may be filtered, sorted, and/or selected using one or more supervised and/or unsupervised machine-learning processes and/or models as described in further detail below; such processes and/or models may include without limitation a training data classifier 316. For the purposes of this disclosure, a "classifier" is a machine-learning model that sorts inputs into categories or bins of data, outputting the categories or bins of data and/or labels associated therewith. Machine-learning model may include without limitation a data structure representing and/or using a mathematical model, neural net, or a program generated by a machine-learning algorithm, known as a "classification algorithm". A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm. For the purposes of this disclosure, a "classification algorithm" is a process wherein a computing device and/or any module and/or component operating therein derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, Fisher's linear discriminant, quadratic classifiers, decision trees, boosted trees, random forest classifiers, learning vector quantization, and/or neural network-based classifiers. In one or more embodiments, training data classifier 316 may classify elements of training data to a plurality of cohorts as a function of certain features or traits.

With continued reference to FIG. 3, machine-learning module 300 may be configured to generate a classifier using a naive Bayes classification algorithm. Naive Bayes classification algorithm generates classifiers by assigning class labels to problem instances, represented as vectors of element values. Class labels are drawn from a finite set. Naive Bayes classification algorithm may include generating a family of algorithms that assume that the value of a particular element is independent of the value of any other element, given a class variable. Naive Bayes classification algorithm may be based on Bayes Theorem expressed as $P(A/B)=P(B/A)\times P(A)\div P(B)$, where P(A/B) is the probability of hypothesis A given data B, also known as posterior probability; P(B/A) is the probability of data B given that the hypothesis A was true; P(A) is the probability of hypothesis A being true regardless of data, also known as prior probability of A; and P(B) is the probability of the data regardless of the hypothesis. A naive Bayes algorithm may be generated by first transforming training data into a frequency table. Machine-learning module 300 may then calculate a likelihood table by calculating probabilities of different data entries and classification labels. Machine-learning module 300 may utilize a naive Bayes equation to calculate a posterior probability for each class. A class containing the highest posterior probability is the outcome of prediction. Naive Bayes classification algorithm may include a gaussian model that follows a normal distribution. Naive Bayes classification algorithm may include a multinomial model that is used for discrete counts. Naive Bayes classification algorithm may include a Bernoulli model that may be utilized when vectors are binary.

With continued reference to FIG. 3, machine-learning module 300 may be configured to generate a classifier using a k-nearest neighbors (KNN) algorithm. For the purposes of this disclosure, a "k-nearest neighbors algorithm" is or at least includes a classification method that utilizes feature similarity to analyze how closely out-of-sample features resemble training data 304 and to classify input data to one or more clusters and/or categories of features as represented in training data 304. This may be performed by representing both training data 304 and input data in vector forms and using one or more measures of vector similarity to identify classifications within training data 304 and determine a classification of input data. K-nearest neighbors algorithm may include specifying a k-value, or a number directing the classifier to select the k most similar entries of training data 304 to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a nonlimiting example, an initial heuristic may include a ranking of associations between inputs 312 and elements of training data 304. Heuristic may include selecting some number of highest-ranking associations and/or training data elements.

With continued reference to FIG. 3, generating k-nearest neighbors algorithm may generate a first vector output containing a data entry cluster, generating a second vector output containing input data, and calculate the distance between the first vector output and the second vector output using any suitable norm such as cosine similarity, Euclidean distance measurement, or the like. Each vector output may be represented, without limitation, as an n-tuple of values, where n is at least 2. Each value of n-tuple of values may represent a measurement or other quantitative value associated with a given category of data or attribute, examples of which are provided in further detail below. A vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent when their directions and/or relative quantities of values are the same; thus, as a nonlimiting example, a vector represented as [5, 10, 15] may be treated as equivalent, for the purposes of this disclosure, as a vector represented as [1, 2, 3]. Vectors may be more similar where their directions are more similar, and more different where their directions are more divergent. However, vector similarity may alternatively, or additionally, be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized", or divided by a "length" attribute, such as a length attribute l as derived using a Pythagorean norm:

$$l = \sqrt{\sum_{i=0}^{n} a_i^2},$$

where $a_i$ is attribute number of vector i. Scaling and/or normalization may function to make vector comparison independent of absolute quantities of attributes, while preserving any dependency on similarity of attributes. This may, for instance, be advantageous where cases represented in training data 304 are represented by different quantities of samples, which may result in proportionally equivalent vectors with divergent values.

With continued reference to FIG. 3, training examples for use as training data may be selected from a population of potential examples according to cohorts relevant to an analytical problem to be solved, a classification task, or the like. Alternatively, or additionally, training data 304 may be selected to span a set of likely circumstances or inputs for a machine-learning model and/or process to encounter when deployed. For instance, and without limitation, for each category of input data to a machine-learning model and/or process that may exist in a range of values in a population of phenomena such as images, user data, process data, physical data, or the like, a computing device, processor 104, and/or machine-learning module 300 may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively, or additionally, a set of training examples may be compared to a collection of representative values in a database and/or presented to user, so that a process can detect, automatically or via user input, one or more values that are not included in the set of training examples. Computing device, processor 104, and/or machine-learning module 300 may automatically generate a missing training example. This may be done by receiving and/or retrieving a missing input and/or output value and correlating the missing input and/or output value with a corresponding output and/or input value collocated in a data record with the retrieved value, provided by user, another device, or the like.

With continued reference to FIG. 3, computing device, processor 104, and/or machine-learning module 300 may be configured to preprocess training data 304. For the purposes of this disclosure, "preprocessing" training data is a process that transforms training data from a raw form to a format that can be used for training a machine-learning model. Preprocessing may include sanitizing, feature selection, feature scaling, data augmentation and the like.

With continued reference to FIG. 3, computing device, processor 104, and/or machine-learning module 300 may be configured to sanitize training data. For the purposes of this disclosure, "sanitizing" training data is a process whereby training examples that interfere with convergence of a machine-learning model and/or process are removed to yield a useful result. For instance, and without limitation, a training example may include an input and/or output value that is an outlier from typically encountered values, such that a machine-learning algorithm using the training example will be skewed to an unlikely range of input 312 and/or output 308; a value that is more than a threshold number of standard deviations away from an average, mean, or expected value, for instance, may be eliminated. Alternatively, or additionally, one or more training examples may be identified as having poor-quality data, where "poor-quality" means having a signal-to-noise ratio below a threshold value. In one or more embodiments, sanitizing training data may include steps such as removing duplicative or otherwise redundant data, interpolating missing data, correcting data errors, standardizing data, identifying outliers, and/or the like. In one or more embodiments, sanitizing training data may include algorithms that identify duplicate entries or spell-check algorithms.

With continued reference to FIG. 3, in one or more embodiments, images used to train an image classifier or other machine-learning model and/or process that takes images as inputs 312 or generates images as outputs 308 may be rejected if image quality is below a threshold value. For instance, and without limitation, computing device, processor 104, and/or machine-learning module 300 may perform blur detection. Elimination of one or more blurs may be performed, as a nonlimiting example, by taking Fourier transform or a Fast Fourier Transform (FFT) of image and analyzing a distribution of low and high frequencies in the resulting frequency-domain depiction of the image. Numbers of high-frequency values below a threshold level may indicate blurriness. As a further nonlimiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of image, based on the hypothesis that rapid changes indicate sharp edges in the image, and thus are indicative of a lower degree of blurriness. Blur detection may be performed using a wavelet-based operator, which uses coefficients of a discrete wavelet transform to describe the frequency and spatial content of images. Blur detection may be performed using statistics-based operators that take advantage of several image statistics as texture descriptors in order to compute a focus level. Blur detection may be performed by using discrete cosine transform (DCT) coefficients in order to compute a focus level of an image from its frequency content.

With continued reference to FIG. 3, computing device, processor 104, and/or machine-learning module 300 may be configured to precondition one or more training examples. For instance, and without limitation, where a machine-learning model and/or process has one or more inputs 312 and/or outputs 308 requiring, transmitting, or receiving a certain number of bits, samples, or other units of data, one or more elements of training examples to be used as or compared to inputs 312 and/or outputs 308 may be modified to have such a number of units of data. In one or more embodiments, computing device, processor 104, and/or machine-learning module 300 may convert a smaller number of units, such as in a low pixel count image, into a desired number of units by upsampling and interpolating. As a nonlimiting example, a low pixel count image may have 100 pixels, whereas a desired number of pixels may be 128. Processor 104 may interpolate the low pixel count image to convert 100 pixels into 128 pixels. It should also be noted that one of ordinary skill in the art, upon reading the entirety of this disclosure, would recognize the various methods to interpolate a smaller number of data units such as samples, pixels, bits, or the like to a desired number of such units. In one or more embodiments, a set of interpolation rules may be trained by sets of highly detailed inputs 312 and/or outputs 308 and corresponding inputs 312 and/or outputs 308 downsampled to smaller numbers of units, and a neural network or another machine-learning model that is trained to predict interpolated pixel values using the training data 304. As a nonlimiting example, a sample input 312 and/or output 308, such as a sample picture, with sample-expanded data units (e.g., pixels added between the original pixels) may be input to a neural network or machine-learning model and output a pseudo replica sample picture with dummy values assigned to pixels between the original pixels based on a set of interpolation rules. As a nonlimiting example, in the context of an image classifier, a machine-learning model may have a set of interpolation rules trained by sets of highly detailed images and images that have been downsampled to smaller numbers of pixels, and a neural network or other machine-learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively, or additionally, computing device, processor 104, and/or machine-learning module 300 may utilize sample expander methods, a low-pass filter, or both. For the purposes of this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor 104, and/or machine-learning module 300 may use averaging, such as luma or chroma averaging in images, to fill in data units in between original data units.

With continued reference to FIG. 3, in one or more embodiments, computing device, processor 104, and/or machine-learning module 300 may downsample elements of a training example to a desired lower number of data elements. As a nonlimiting example, a high pixel count image may contain 256 pixels, however a desired number of pixels may be 128. Processor 104 may downsample the high pixel count image to convert 256 pixels into 128 pixels. In one or more embodiments, processor 104 may be configured to perform downsampling on data. Downsampling, also known as decimation, may include removing every Nth entry in a sequence of samples, all but every Nth entry, or the like, which is a process known as "compression" and may be performed, for instance by an N-sample compressor implemented using hardware or software. Anti-aliasing and/or anti-imaging filters, and/or low-pass filters, may be used to eliminate side effects of compression.

With continued reference to FIG. 3, feature selection may include narrowing and/or filtering training data 304 to exclude features and/or elements, or training data including such elements that are not relevant to a purpose for which a trained machine-learning model and/or algorithm is being trained, and/or collection of features, elements, or training data including such elements based on relevance to or utility for an intended task or purpose for which a machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, wherein a difference between each value, X, and a minimum value, $X_{min}$, in a set or subset of values is divided by a range of values, $X_{max}-X_{min}$, in the set or subset:

$$X_{new} = \frac{X - X_{min}}{X_{max} - X_{min}}.$$

Feature scaling may include mean normalization, wherein a difference between each value, X, and a mean value of a set and/or subset of values, $X_{mean}$, is divided by a range of values, $X_{max}-X_{min}$, in the set or subset:

$$X_{new} = \frac{X - X_{mean}}{X_{max} - X_{min}}.$$

Feature scaling may include standardization, wherein a difference between X and $X_{mean}$ is divided by a standard deviation, σ, of a set or subset of values:

$$X_{new} = \frac{X - X_{mean}}{\sigma}.$$

Feature scaling may be performed using a median value of a set or subset, $X_{median}$, and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

A Person of ordinary skill in the art, upon reviewing the entirety of this disclosure, will be aware of various alternative or additional approaches that may be used for feature scaling.

With continued reference to FIG. 3, computing device, processor 104, and/or machine-learning module 300 may be configured to perform one or more processes of data augmentation. For the purposes of this disclosure, "data augmentation" is a process that adds data to a training data 304 using elements and/or entries already in the dataset. Data augmentation may be accomplished, without limitation, using interpolation, generation of modified copies of existing entries and/or examples, and/or one or more generative artificial intelligence (AI) processes, for instance using deep neural networks and/or generative adversarial networks. Generative processes may be referred to alternatively in this context as "data synthesis" and as creating "synthetic data". Augmentation may include performing one or more transformations on data, such as geometric, color space, affine, brightness, cropping, and/or contrast transformations of images.

With continued reference to FIG. 3, machine-learning module 300 may be configured to perform a lazy learning process and/or protocol 320. For the purposes of this disclosure, a "lazy learning" process and/or protocol is a process whereby machine learning is conducted upon receipt of input 312 to be converted to output 308 by combining the input 312 and training data 304 to derive the algorithm to be used to produce the output 308 on demand. A lazy learning process may alternatively be referred to as a "lazy loading" or "call-when-needed" process and/or protocol. For instance, an initial set of simulations may be performed to cover an initial heuristic and/or "first guess" at an output 308 and/or relationship. As a nonlimiting example, an initial heuristic may include a ranking of associations between inputs 312 and elements of training data 304. Heuristic may include selecting some number of highest-ranking associations and/or training data 304 elements. Lazy learning may implement any suitable lazy learning algorithm, including without limitation a k-nearest neighbors algorithm, a lazy naive Bayes algorithm, or the like. A person of ordinary skill in the art, upon reviewing the entirety of this disclosure, will be aware of various lazy learning algorithms that may be applied to generate outputs as described in this disclosure, including without limitation lazy learning applications of machine-learning algorithms as described in further detail below.

With continued reference to FIG. 3, alternatively, or additionally, machine-learning processes as described in this disclosure may be used to generate machine-learning models 324. For the purposes of this disclosure, a "machine-learning model" a data structure representing and/or instantiating a mathematical and/or algorithmic representation of a relationship between inputs 312 and outputs 308, generated using any machine-learning process including without limitation any process described above, and stored in memory. An input 312 is submitted to a machine-learning model 324 once created, which generates an output 308 based on the relationship that was derived. For instance, and without limitation, a linear regression model, generated using a linear regression algorithm, may compute a linear combination of input data using coefficients derived during machine-learning processes to calculate an output datum. As a further nonlimiting example, a machine-learning model 324 may be generated by creating an artificial neural network, such as a convolutional neural network comprising an input layer of nodes, one or more intermediate layers, and an output layer of nodes. Connections between nodes may be created by "training" the network, in which elements from a training data 304 are applied to the input nodes, and a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning, as described in detail below.

With continued reference to FIG. 3, machine-learning module 300 may perform at least a supervised machine-learning process 328. For the purposes of this disclosure, a "supervised" machine-learning process is a process with algorithms that receive training data 304 relating one or more inputs 312 to one or more outputs 308, and seek to generate one or more data structures representing and/or instantiating one or more mathematical relations relating input 312 to output 308, where each of the one or more mathematical relations is optimal according to some criterion specified to the algorithm using some scoring function. For instance, a supervised learning algorithm may include inputs 312 described above as inputs, and outputs 308 described above as outputs, and a scoring function representing a desired form of relationship to be detected between inputs 312 and outputs 308. Scoring function may, for instance, seek to maximize the probability that a given input 312 and/or combination thereof is associated with a given output 308 to minimize the probability that a given input 312 is not associated with a given output 308. Scoring function may be expressed as a risk function representing an "expected loss" of an algorithm relating inputs 312 to outputs 308, where loss is computed as an error function representing a degree to which a prediction generated by the relation is incorrect when compared to a given input-output pair provided in training data 304. Supervised machine-learning processes may include classification algorithms as defined above. A person of ordinary skill in the art, upon reviewing the entirety of this disclosure, will be aware of various possible variations of at least a supervised machine-learning process 328 that may be used to determine a relation between inputs and outputs.

With continued reference to FIG. 3, training a supervised machine-learning process may include, without limitation, iteratively updating coefficients, biases, and weights based on an error function, expected loss, and/or risk function. For instance, an output 308 generated by a supervised machine-learning process 328 using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updates may be performed in neural networks using one or more back-propagation algorithms. Iterative and/or recursive updates to weights, biases, coefficients, or other parameters as described above may be performed until currently available training data 304 are exhausted and/or until a convergence test is passed. For the purposes of this disclosure, a "convergence test" is a test for a condition selected to indicate that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively, or additionally, one or more errors and/or error function values evaluated in training iterations may be compared to a threshold.

With continued reference to FIG. 3, a computing device, processor 104, and/or machine-learning module 300 may be configured to perform method, method step, sequence of method steps, and/or algorithm described in reference to this figure, in any order and with any degree of repetition. For instance, computing device, processor 104, and/or machine-learning module 300 may be configured to perform a single step, sequence, and/or algorithm repeatedly until a desired or commanded outcome is achieved; repetition of a step or a sequence of steps may be performed iteratively and/or recursively using outputs 308 of previous repetitions as inputs 312 to subsequent repetitions, aggregating inputs 312 and/or outputs 308 of repetitions to produce an aggregate result, reduction or decrement of one or more variables such as global variables, and/or division of a larger processing task into a set of iteratively addressed smaller processing tasks. A computing device, processor 104, apparatus 100, or machine-learning module 300 may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. A person of ordinary skill in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 3, machine-learning process may include at least an unsupervised machine-learning process 332. For the purposes of this disclosure, an "unsupervised" machine-learning process is a process that derives inferences in datasets without regard to labels. As a result, an unsupervised machine-learning process 332 may be free to discover any structure, relationship, and/or correlation provided in the data. Unsupervised processes 332 may not require a response variable, may be used to find interesting patterns and/or inferences between variables, to determine a degree of correlation between two or more variables, or the like.

With continued reference to FIG. 3, machine-learning module 300 may be designed and configured to create machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include an elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to a person of ordinary skill in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought. Similar methods to those described above may be applied to minimize error functions, as will be apparent to a person of ordinary skill in the art upon reviewing the entirety of this disclosure.

With continued reference to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

With continued reference to FIG. 3, a machine-learning model and/or process may be deployed or instantiated by incorporation into a program, apparatus, system, and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit, to represent a number according to any suitable encoding system including twos complement or the like, or may be stored in any volatile and/or non-volatile memory. Similarly, mathematical operations and input 312 and/or output 308 of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation application-specific integrated circuits (ASICs), production and/or configuration of reconfigurable hardware elements, circuits, and/or modules such as without limitation field programmable gate arrays (FPGAs), production and/or configuration of non-reconfigurable and/or non-rewritable memory elements, circuits, and/or modules such as without limitation non-rewritable read-only memory (ROM), other memory technology described in this disclosure, and/or production and/or configuration of any computing device and/or component thereof as described in this disclosure. Such deployed and/or instantiated machine-learning model and/or algorithm may receive inputs 312 from any other process, module, and/or component described in this disclosure, and produce outputs 308 to any other process, module, and/or component described in this disclosure.

With continued reference to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively, or additionally, retraining, deployment, and/or instantiation may be event-based, and may be triggered, without limitation, by user inputs indicating sub-optimal or otherwise problematic performance and/or by automated field testing and/or auditing processes, which may compare outputs 308 of machine-learning models and/or algorithms, and/or errors and/or error functions thereof, to any thresholds, convergence tests, or the like, and/or may compare outputs 308 of processes described herein to similar thresholds, convergence tests or the like. Event-based retraining, deployment, and/or instantiation may alternatively, or additionally, be triggered by receipt and/or generation of one or more new training examples; a number of new training examples may be compared to a preconfigured threshold, where exceeding the preconfigured threshold may trigger retraining, deployment, and/or instantiation.

With continued reference to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized, or otherwise processed according to any process described in this disclosure. Training data 304 may include, without limitation, training examples including inputs 312 and correlated outputs 308 used, received, and/or generated from any version of any system, module, machine-learning model or algorithm, apparatus, and/or method described in this disclosure. Such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs 308 for training processes as described above. Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

With continued reference to FIG. 3, one or more processes or algorithms described above may be performed by at least a dedicated hardware unit 336. For the purposes of this disclosure, a "dedicated hardware unit" is a hardware component, circuit, or the like, aside from a principal control circuit and/or processor 104 performing method steps as described in this disclosure, that is specifically designated or selected to perform one or more specific tasks and/or processes described in reference to this figure. Such specific tasks and/or processes may include without limitation preprocessing and/or sanitization of training data and/or training a machine-learning algorithm and/or model. Dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously, in parallel, and/or the like. Such dedicated hardware units 336 may include, without limitation, graphical processing units (GPUs), dedicated signal processing modules, field programmable gate arrays (FPGA), other reconfigurable hardware that has been configured to instantiate parallel processing units for one or more specific tasks, or the like. Computing device, processor 104, apparatus 100, or machine-learning module 300 may be configured to instruct one or more dedicated hardware units 336 to perform one or more operations described herein, such as evaluation of model and/or algorithm outputs, one-time or iterative updates to parameters, coefficients, weights, and/or biases, vector and/or matrix operations, and/or any other operations described in this disclosure.

Figure 4:
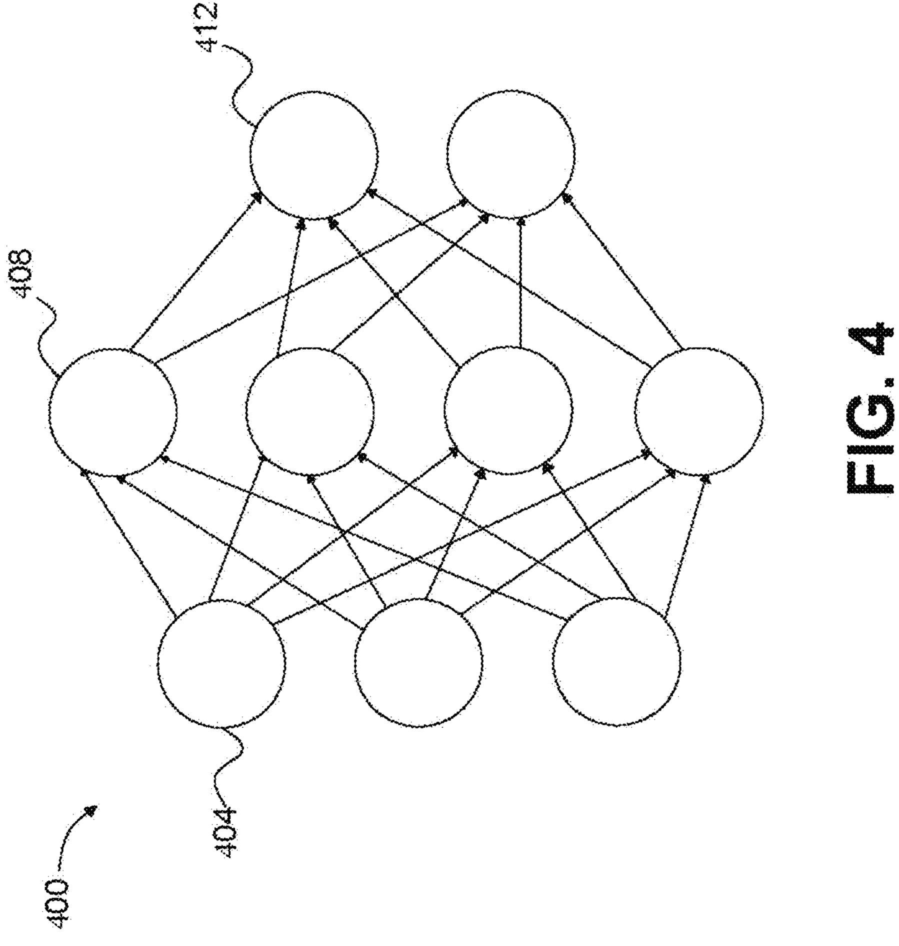
FIG. 4 is a block diagram of an exemplary embodiment of a neural network.

Referring now to FIG. 4, an exemplary embodiment of neural network 400 is illustrated. For the purposes of this disclosure, a "neural network" or "artificial neural network" is a network of "nodes" or data structures having one or more inputs, one or more outputs, and a function determining outputs based on inputs. Such nodes may be organized in a network, such as without limitation a convolutional neural network, including an input layer of nodes 404, at least an intermediate layer of nodes 408, and an output layer of nodes 412. Connections between nodes may be created via the process of "training" neural network 400, in which elements from a training dataset are applied to the input nodes, and a suitable training algorithm (such as Levenberg-Marquardt, conjugate gradient, simulated annealing, or other algorithms) is then used to adjust the connections and weights between nodes in adjacent layers of the neural network 400 to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network". As a further nonlimiting example, neural network 400 may include a convolutional neural network comprising an input layer of nodes 404, one or more intermediate layers of nodes 408, and an output layer of nodes 412. For the purposes of this disclosure, a "convolutional neural network" is a type of neural network 400 in which at least one hidden layer is a convolutional layer that convolves inputs to that layer with a subset of inputs known as a "kernel", along with one or more additional layers such as pooling layers, fully connected layers, and the like.

Figure 5:
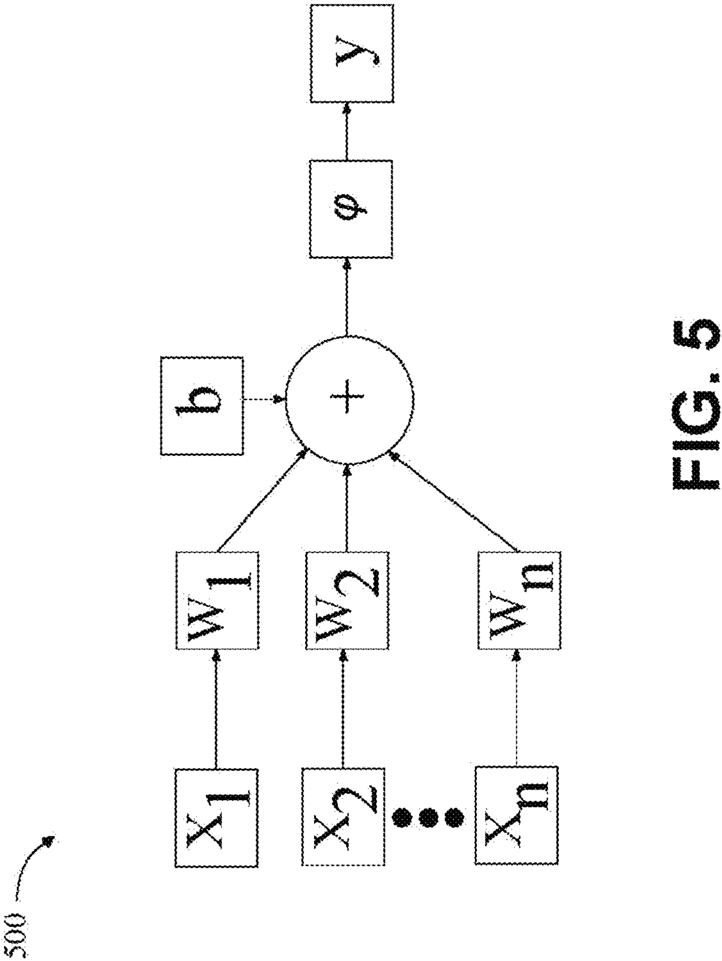
FIG. 5 is a block diagram of an exemplary embodiment of a node of a neural network.

Referring now to FIG. 5, an exemplary embodiment of a node 500 of neural network 400 is illustrated. Node 500 may include, without limitation, a plurality of inputs, $x_i$, that may receive numerical values from inputs to neural network 400 containing the node 500 and/or from other nodes 500. Node 500 may perform one or more activation functions to produce its output given one or more inputs, such as without limitation computing a binary step function comparing an input to a threshold value and outputting either a logic 1 or logic 0 output or its equivalent, a linear activation function whereby an output is directly proportional to input, and/or a nonlinear activation function wherein the output is not proportional to the input. Nonlinear activation functions may include, without limitation, a sigmoid function of the form $$f(x) = \frac{1}{1 - e^{-x}}$$

given input x, a tanh (hyperbolic tangent) function of the form $$\frac{e^x - e^{-x}}{e^x + e^{-x}},$$

a tanh derivative function such as $f(x)=\tanh^2(x)$, a rectified linear unit function such as f(x)=max(0, x), a "leaky" and/or "parametric" rectified linear unit function such as f(x)=max (ax, x) for some value of a, an exponential linear units function such as $$f(x) = \begin{cases} x \text{ for } x \geq 0 \\ \alpha(e^x - 1) \text{ for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as f(x)=x*sigmoid(x), a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$, that may be used as activation functions. As a nonlimiting and illustrative example, node 500 may perform a weighted sum of inputs using weights, $w_i$, that are multiplied by respective inputs, $x_i$. Additionally, or alternatively, a bias b may be added to the weighted sum of the inputs such that an offset is added to each unit in a neural network layer that is independent of the input to the layer. The weighted sum may then be input into a function, φ, which may generate one or more outputs, y. Weight, $w_i$, applied to an input, $x_i$, may indicate whether the input is "excitatory", indicating that it has strong influence on the one or more outputs, y, for instance by the corresponding weight having a large numerical value, or "inhibitory", indicating it has a weak influence on the one more outputs, y, for instance by the corresponding weight having a small numerical value. The values of weights, $w_i$, may be determined by training neural network 400 using training data, which may be performed using any suitable process as described above.

Figure 6:
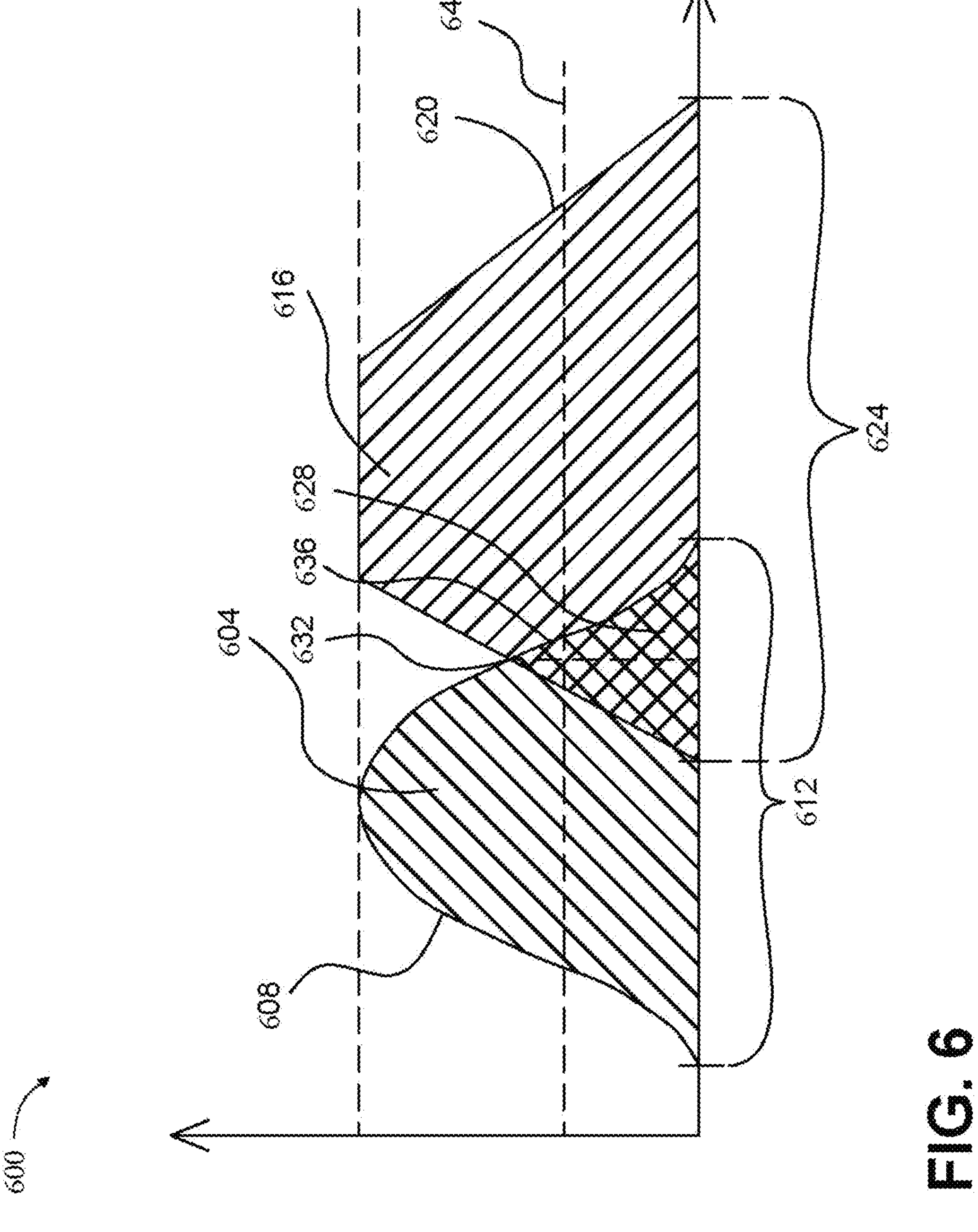
FIG. 6 is an illustration of an exemplary embodiment of fuzzy set comparison.

Referring now to FIG. 6, an exemplary embodiment of fuzzy set comparison 600 is illustrated. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within the first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range of values 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

A person of ordinary skill in the art, upon reviewing the entirety of this disclosure, will be aware of various alternative or additional membership functions that may be used consistently with this disclosure.

With continued reference to FIG. 6, in one or more embodiments, first fuzzy set 604 may represent any value or combination of values as described above, including output from one or more machine-learning models. A second fuzzy set 616, which may represent any value which may be represented by first fuzzy set 604, may be defined by a second membership function 620 on a second range 624; second range 624 may be identical and/or overlap with first range of values 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 632 representing a probability, as defined on probability interval, of a match between first fuzzy set 604 and second fuzzy set 616. Alternatively, or additionally, a single value of first and/or second fuzzy set may be located at a locus 636 on first range of values 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a nonlimiting example, represent a degree of match between first fuzzy set 604 and second fuzzy set 616, and/or single values therein with each other or with either set, which is sufficient for purposes of the matching process; for instance, threshold 640 may indicate a sufficient degree of overlap between an output from one or more machine-learning models. Alternatively, or additionally, each threshold 640 may be tuned by a machine learning and/or statistical process, for instance and without limitation as described in further detail in this disclosure.

With continued reference to FIG. 6, in one or more embodiments, a degree of match between fuzzy sets may be used to classify plurality of digital records 116 and/or match one or more query attributes 132 thereto, as described above in this disclosure. As a nonlimiting example, if one or more attributes are associated with a fuzzy set that matches a fuzzy set of a cohort 124 by having a degree of overlap exceeding a threshold, computing device may classify the attribute as belonging to that cohort 124. Where multiple fuzzy matches are performed, degrees of match for each respective fuzzy set may be computed and aggregated through, for instance, addition, averaging, or the like, to determine an overall degree of match.

With continued reference to FIG. 6, in one or more embodiments, one or more attributes may be compared to multiple fuzzy sets of multiple cohorts 124. As a nonlimiting example, one or more reference attributes 120 within one or more digital records 116 may be represented by a fuzzy set that is compared to each of the multiple fuzzy sets of multiple cohorts 124, and a degree of overlap exceeding a threshold between the fuzzy set representing the one or more reference attributes 120 and any of the multiple fuzzy sets representing multiple cohorts 124 may cause computing device to classify the one or more reference attributes 120 as belonging to that cohort 124. As a nonlimiting example, there may be two fuzzy sets representing two cohorts 124, cohort A and cohort B. Cohort A may have a cohort A fuzzy set, cohort B may have a cohort B fuzzy set, and one or more reference attributes 120 may have a reference attribute fuzzy set. Computing device may compare reference attribute fuzzy set with each of cohort A fuzzy set and cohort B fuzzy set, as described above, and classify the one or more reference attributes 120 to either, both, or neither of cohort A fuzzy set and cohort B fuzzy set. Similar principles may be applied to classify one or more query attributes 132 as well. Machine-learning methods as described throughout this disclosure may, in a nonlimiting example, generate coefficients used in fuzzy set equations as described above, such as without limitation x, c, and σ of a Gaussian set as described above, as outputs of machine learning methods. Likewise, one or more reference attributes 120 may be used indirectly to determine a fuzzy set, as reference attribute fuzzy set may be derived from outputs of one or more machine-learning models that take reference attributes 120 directly or indirectly as inputs.

With continued reference to FIG. 6, in one or more embodiments, fuzzy set comparison 600 may include a fuzzy inference model. For the purposes of this disclosure, a "fuzzy inference model" is a model that uses fuzzy logic to reach a decision and derive a meaningful outcome. As a nonlimiting example, a fuzzy inference system may be associated with various metrics (e.g., with various intelligence metrics 152), as described above. In one or more embodiments, an inferencing rule may be applied to determine a fuzzy set membership of a combined output based on the fuzzy set membership of linguistic variables. As a nonlimiting example, membership of a combined output in a "medium-level match" fuzzy set may be determined based on a percentage membership of a second linguistic variable with a first mode in fuzzy set X and a percentage membership of the second linguistic variable associated with a second mode in fuzzy set Y. In one or more embodiments, parameters of overlaps may then be determined by comparison to a threshold or output using another defuzzification process. Each stage of such a process may be implemented using any type of machine-learning model, such as any type of neural network, as described herein. In one or more embodiments, parameters of one or more fuzzy sets may be tuned using machine learning. In one or more embodiments, fuzzy inferencing and/or machine learning may be used to synthesize an overall output (e.g., aggregate intelligence metric 152) from individual outputs (e.g., a plurality of intelligence metrics 152). In some cases, outputs may be combined to make an overall or final determination, which may be displayed with or instead of individual outputs. As another nonlimiting example, outputs may be ranked, wherein the output with the highest confidence score may be the output displayed at display device or displayed first in a ranked display of result outputs, consistent with details described above.

With continued reference to FIG. 6, fuzzy set comparison 600 may be generated as a function of determining a data compatibility threshold. Data compatibility threshold may be determined by a computing device. In some embodiments, computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine learning, or other method that may occur to a person of ordinary skill in the art upon reviewing the entirety of this disclosure. In some embodiments, determining compatibility threshold may include using a linear regression model. A linear regression model may include a machine-learning model. In some embodiments, determining compatibility threshold may include using a classification model. A classification model may be configured to input collected data and cluster data to a centroid based on, but not limited to, frequency of appearance, linguistic indicators of compatibility and/or allowability, and the like. Centroids may include scores assigned to them such that the compatibility threshold may each be assigned a score. In some embodiments, a classification model may include a k-means clustering model. In some embodiments, a classification model may include a particle swarm optimization model. In some embodiments, determining a compatibility threshold may include using a fuzzy inference engine. A fuzzy inference engine may be configured to map one or more compatibility thresholds using fuzzy logic. In some embodiments, a plurality of computing devices may be arranged by a logic comparison program into compatibility arrangements. Membership function coefficients and/or constants as described above may be tuned according to classification and/or clustering algorithms. As a nonlimiting example, a clustering algorithm may determine a Gaussian or other distribution about a centroid corresponding to a given compatibility threshold, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

With continued reference to FIG. 6, an inference engine may combine rules, such as any semantic language and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), associativity: T(a, T(b, c))=T(T(a, b), c), and the requirement that the number 1 acts as an identity element. Combinations of rules ("and" or "or" combination of rule membership determinations) may be performed using any T-conorm, as represented by an inverted T symbol or "⊥", such as max(a, b), probabilistic sum of a and b (a+b−a×b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively, or additionally, T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

Figure 7:
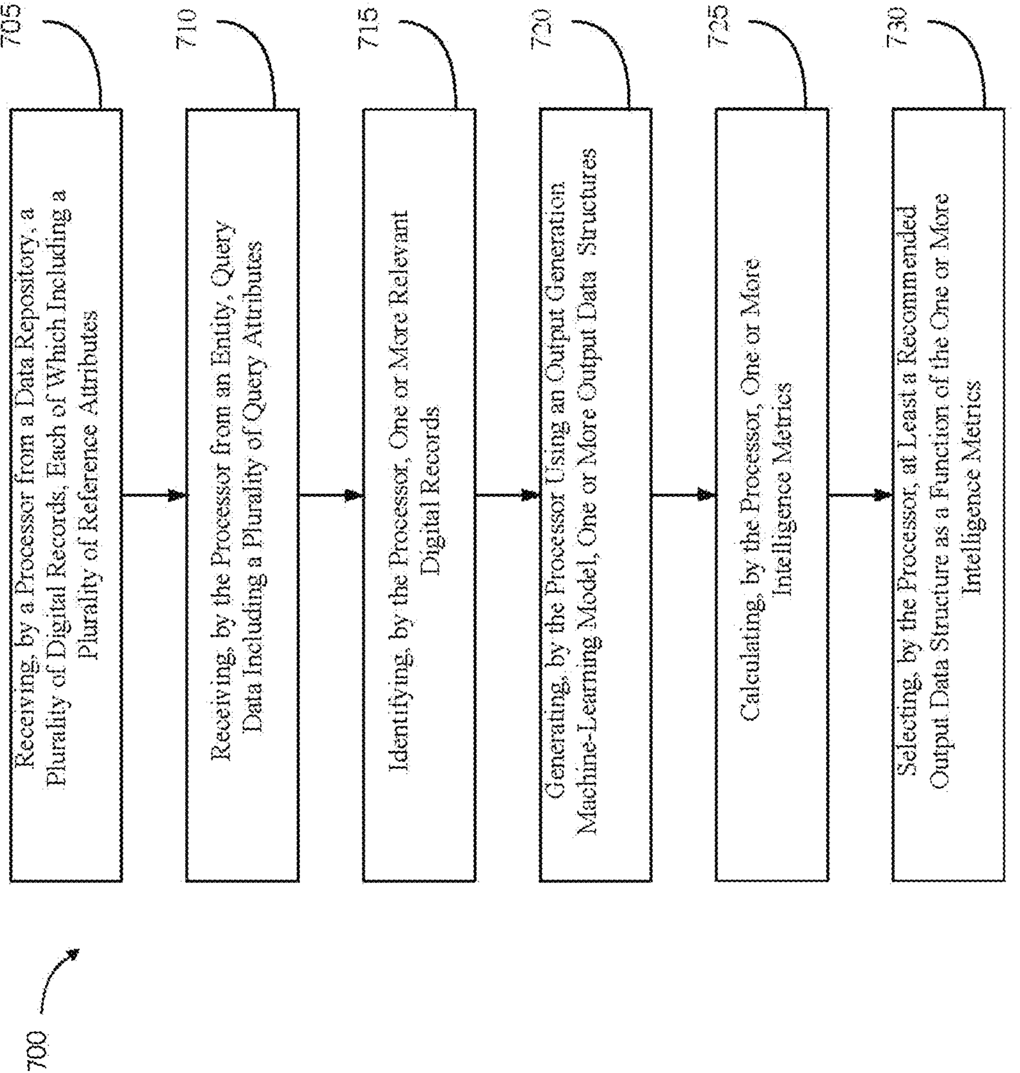
FIG. 7 is an exemplary flow diagram illustrating a method for generating data intelligence.

Referring now to FIG. 7, an exemplary embodiment of a method 700 for generating data intelligence is described. At step 705, method 700 includes receiving, by processor 104 from data repository 112, plurality of digital records 116, wherein each digital record 116 of the plurality of digital records 116 includes plurality of reference attributes 120. This step may be implemented with reference to details described above in this disclosure and without limitation.

With continued reference to FIG. 7, at step 710, method 700 further includes receiving, by processor 104 from an entity, query data 128, wherein the query data 128 include plurality of query attributes 132. This step may be implemented with reference to details described above in this disclosure and without limitation.

With continued reference to FIG. 7, at step 715, method 700 further includes identifying, by processor 104, one or more relevant digital records 116 by matching one or more query attributes 132 of the plurality of query attributes 132 with one or more reference attributes 120 of plurality of reference attributes 120. This step may be implemented with reference to details described above in this disclosure and without limitation.

With continued reference to FIG. 7, at step 720, method 700 includes generating, by processor 104 using output generation machine-learning model 144 trained on output generation training data 148, one or more output data structures 140 as a function of one or more relevant digital records 116. This step may be implemented with reference to details described above in this disclosure and without limitation.

With continued reference to FIG. 7, at step 725, method 700 includes calculating, by processor 104, one or more intelligence metrics 152 as a function of each output data structure 140 of one or more output data structures 140, wherein at least an intelligence metric 152 of the one or more intelligence metrics 152 includes an estimated likelihood of positive outcome (ELPO) 156. This step may be implemented with reference to details described above in this disclosure and without limitation.

With continued reference to FIG. 7, at step 730, method 700 includes selecting, by processor 104, at least a recommended output data structure 140 as a function of one or more intelligence metrics 152. This step may be implemented with reference to details described above in this disclosure and without limitation.

Figure 8:
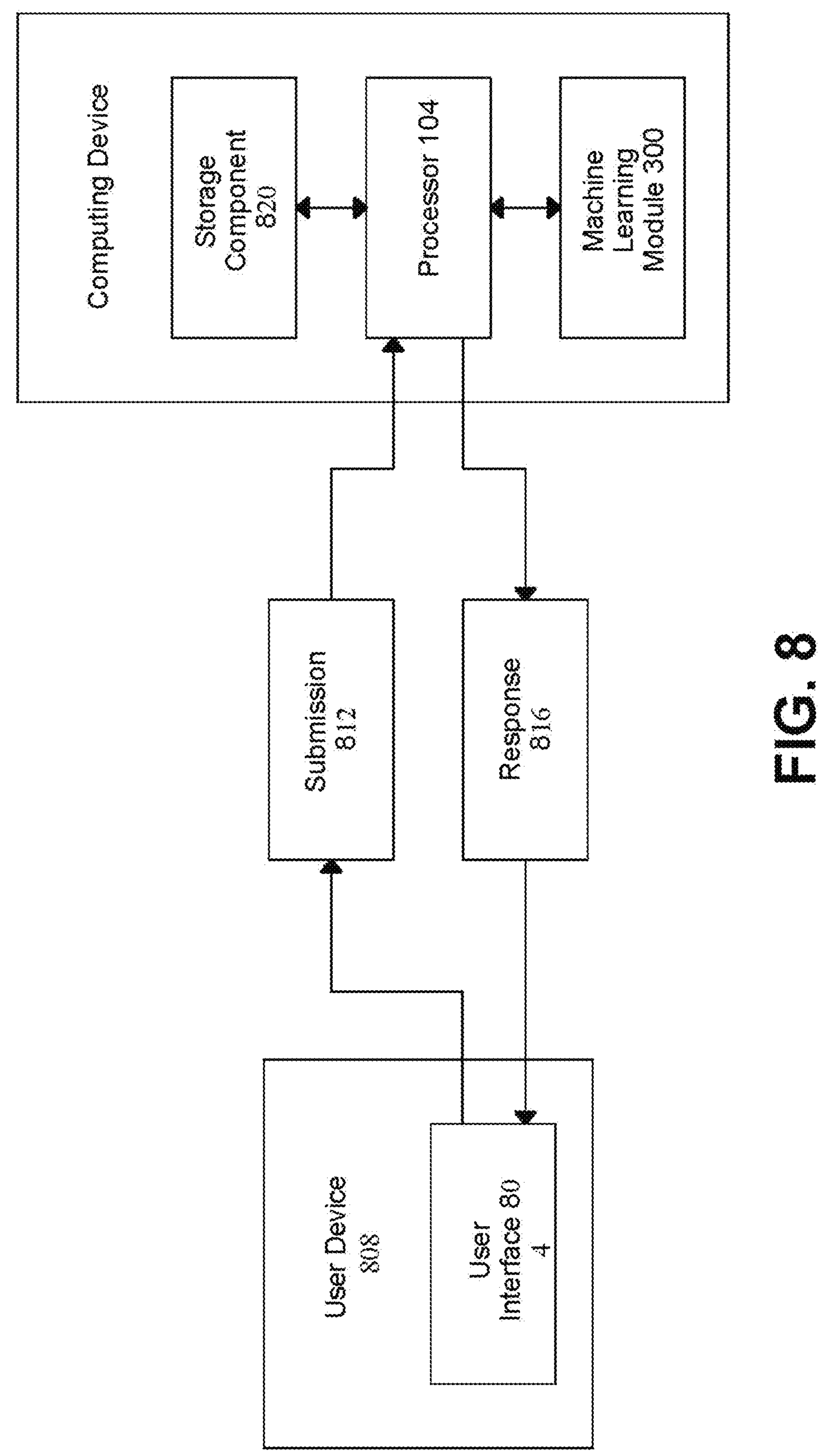
FIG. 8 is an exemplary embodiment of a chatbot system.

Referring now to FIG. 8, in one or more embodiments, apparatus 100 may perform one or more of its functions, such as receipt of query data, by implementing at least a chatbot system 800, an exemplary embodiment of which is schematically illustrated. In one or more embodiments, a user interface 804 may be communicatively connected with a computing device that is configured to operate a chatbot. In some cases, user interface 804 may be local to computing device. Alternatively, or additionally, in some other cases, user interface 804 may be remote to computing device, e.g., as part of a user device 808, and communicative with the computing device and processor 104 therein, by way of one or more networks, such as without limitation the internet. Alternatively, or additionally, user interface 804 may communicate with user interface 804 and/or computing device using telephonic devices and networks, such as without limitation fax machines, short message service (SMS), or multimedia message service (MMS). Commonly, user interface 804 may communicate with computing device using text-based communication, for example without limitation using a character encoding protocol, such as American Standard for Information Interchange (ASCII). Typically, user interface 804 may conversationally interface a chatbot, by way of at least a submission 812, from the user interface 804 to the chatbot, and a response 816, from the chatbot to the user interface 804. In many cases, one or both of submission 812 and response 816 are text-based communication. Alternatively, or additionally, in some cases, one or both of submission 812 and response 816 are audio-based communication.

With continued reference to FIG. 8, submission 812, once received by user interface 804 and/or computing device that operates a chatbot, may be processed by processor 104. In one or more embodiments, processor 104 may process submission 812 using one or more of keyword recognition, pattern matching, and natural language processing. In one or more embodiments, processor 104 may employ real-time learning with evolutionary algorithms. In one or more embodiments, processor 104 may retrieve a pre-prepared response from at least a storage component 820, based upon submission 812. Alternatively, or additionally, in one or more embodiments, processor 104 may communicate a response 816 without first receiving a submission 812, thereby initiating a conversation. In some cases, processor 104 may communicate an inquiry to user interface 804 and/or computing device, wherein processor 104 is configured to process an answer to the inquiry in a following submission 812 from the user interface 804 and/or computing device. In some cases, an answer to an inquiry presented within submission 812 from user interface 804 and/or computing device may be used by the computing device as an input to another function.

Figure 9:
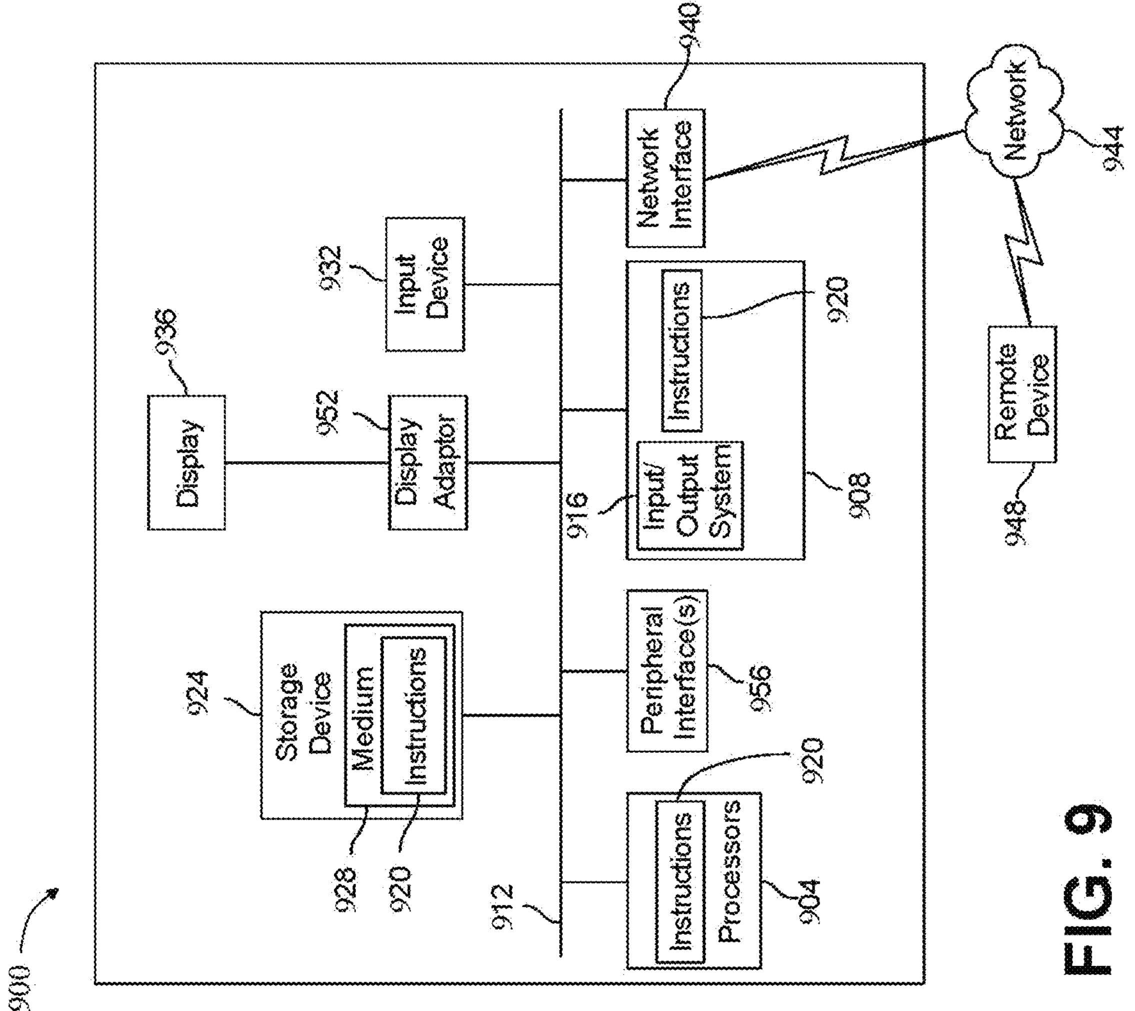
FIG. 9 is a block diagram of an exemplary embodiment of a computing system that can be used to implement any one or more of the methodologies disclosed herein and any one or more portions thereof.

Referring now to FIG. 9, it is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to one of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module. Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission. Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein. Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

With continued reference to FIG. 9, the figure shows a diagrammatic representation of one embodiment of a computing device in the exemplary form of a computing system 900 within which a set of instructions for causing the computing system 900 to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computing system 900 may include a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures. Processor 904 may include any suitable processor, such as without limitation a processor incorporating logical circuitry for performing arithmetic and logical operations, such as an arithmetic and logic unit, which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor, field programmable gate array, complex programmable logic device, graphical processing unit, general-purpose graphical processing unit, tensor processing unit, analog or mixed signal processor, trusted platform module, a floating-point unit, and/or system on a chip.

With continued reference to FIG. 9, memory 908 may include various components (e.g., machine-readable media) including, but not limited to, a random-access memory component, a read only component, and any combinations thereof. In one example, a basic input/output system 916, including basic routines that help to transfer information between elements within computing system 900, such as during start-up, may be stored in memory 908. Memory 908 (e.g., stored on one or more machine-readable media) may also include instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

With continued reference to FIG. 9, computing system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, small computer system interface, advanced technology attachment, serial advanced technology attachment, universal serial bus, IEEE 1394 (FIREWIRE), and any combinations thereof. In one example, storage device 924 (or one or more components thereof) may be removably interfaced with computing system 900 (e.g., via an external port connector (not shown)). Particularly, storage device 924 and an associated machine-readable medium 928 may provide nonvolatile and/or volatile storage of machine-readable instructions, data structures, program modules, and/or other data for computing system 900. In one example, software 920 may reside, completely or partially, within machine-readable medium 928. In another example, software 920 may reside, completely or partially, within processor 904.

With continued reference to FIG. 9, computing system 900 may also include an input device 932. In one example, a user of computing system 900 may enter commands and/or other information into computing system 900 via input device 932. Examples of input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display device 936, discussed further below. Input device 932 may be utilized as a user selection device for selecting one or more graphical representations in a graphical interface as described above.

With continued reference to FIG. 9, user may also input commands and/or other information to computing system 900 via storage device 924 (e.g., a removable disk drive, a flash drive, etc.) and/or network interface device 940. A network interface device, such as network interface device 940, may be utilized for connecting computing system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide-area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computing system 900 via network interface device 940.

With continued reference to FIG. 9, computing system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Video display adapter 952 and display device 936 may be utilized in combination with processor 904 to provide graphical representations of aspects of the present disclosure. In addition to a display device, computing system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating data intelligence, the apparatus comprising:

a display device, wherein the display device comprises a remote device communicatively connected to the apparatus;

a processor; and a memory communicatively connected to the processor, wherein the memory contains instructions configuring the processor to:

receive from a data repository a plurality of digital records, wherein each digital record of the plurality of digital records comprises a plurality of reference attributes;

receive query data from an entity, using the remote device, wherein the query data comprise a plurality of query attributes;

identify one or more relevant digital records by matching one or more query attributes of the plurality of query attributes with one or more reference attributes of the plurality of reference attributes;

quantify relevant features of the one or more relevant digital records using an attention mechanism, wherein the attention mechanism is configured to detect where the relevant features are concentrated;

generate one or more context vectors based on the concentrated relevant features;

generate, using an output generation machine-learning model trained on output generation training data, one or more output data structures as a function of the one or more context vectors, the relevant features, and the one or more relevant digital records;

perform, using at least one of the processor and the output generation machine-learning model, a data augmentation process for generating and adding synthetic data to the output generation training data;

specify, using the one or more output data structures, a treatment plan by populating a hypothetical digital record associated with a hypothetical entity profile with at least one parameter associated with the one or more relevant digital records, wherein the one or more output data structures are configured to comprise the generated synthetic data;

generate an intelligence machine-learning model, wherein generating the intelligence machine-learning model comprises iteratively training the intelligence machine-learning model using intelligence training data, wherein the intelligence training data correlating one or more output data structures generated using the output generation machine-learning model to intelligence metric inputs;

calculate one or more intelligence metrics, using the trained intelligence machine-learning model, as a function of each output data structure of the one or more output data structures, wherein at least an intelligence metric of the one or more intelligence metrics comprises an estimated likelihood of positive outcome; and wherein the one or more intelligence metrics comprises a frequency metric configured to reflect a technical difficulty level of a process;

select at least a recommended output data structure as a function of the one or more intelligence metrics; and display, using a user interface, the selected at least a recommended output data.

2. The apparatus of claim 1, wherein the processor is further configured to display, using a graphical user interface, the at least a recommended output data structure.

3. The apparatus of claim 1, wherein selecting the at least a recommended output data structure comprises:

calculating an aggregate intelligence metric for each output data structure of the one or more output data structures, as a function of the one or more intelligence metrics;

ranking the one or more output data structures as a function of the aggregate intelligence metric; and selecting the at least a recommended output data structure as a function of the rank.

4. The apparatus of claim 1, wherein:

the plurality of digital records comprises a plurality of electronic health records (EHR); and the plurality of query attributes comprises at least a diagnostic feature pertaining to the entity.

5. The apparatus of claim 1, wherein:

the plurality of query attributes comprises at least a resource attribute and at least a positional attribute; and selecting the at least a recommended output data structure comprises identifying the at least a recommended output data structure as a function of the at least a resource attribute and the at least a positional attribute.

6. The apparatus of claim 1, wherein:

receiving the plurality of digital records comprises grouping the plurality of digital records into a plurality of cohorts, wherein each cohort of the plurality of cohorts shares one or more reference attributes; and calculating the one or more intelligence metrics comprises:

labeling each output data structure of the one or more output data structures as a function of the plurality of cohorts; and calculating the one or more intelligence metrics as a function of the label.

7. The apparatus of claim 1, wherein generating the one or more output data structures comprises:

receiving output generation training data comprising a plurality of exemplary output data structures as outputs correlated with a plurality of exemplary digital records as inputs;

iteratively training the output generation machine-learning model using the output generation training data; and generating the one or more output data structures using the output generation machine-learning model.

8. The apparatus of claim 1, wherein at least an intelligence metric of the one or more intelligence metrics comprises at least a risk metric.

9. A method for generating data intelligence, the method comprising: receiving, by a processor from a data repository, a plurality of digital records, wherein each digital record of the plurality of digital records comprises a plurality of reference attributes;

receiving, by the processor from an entity, query data, wherein the query data comprise a plurality of query attributes;

identifying, by the processor, one or more relevant digital records by matching one or more query attributes of the plurality of query attributes with one or more reference attributes of the plurality of reference attributes;

quantifying, by the processor, relevant features of the one or more relevant digital records using an attention mechanism, wherein the attention mechanism is configured to detect where the relevant features are concentrated;

generating, by the processor, one or more context vectors based on the concentrated relevant features;

generating, by the processor using an output generation machine-learning model trained on output generation training data, one or more output data structures as a function of the one or more context vectors, the relevant features, and the one or more relevant digital records;

performing, using at least one of the processor and the output generation machine-learning model, a data augmentation process for generating and adding synthetic data to the output generation training data;

specify, using the one or more output data structures, a treatment plan by populating a hypothetical digital record associated with a hypothetical entity profile with at least one parameter associated with the one or more relevant digital records, wherein the one or more output data structures are configured to comprise the generated synthetic data;

generating, by the at least a processor, an intelligence machine-learning model, wherein generating the intelligence machine-learning model comprises iteratively training the intelligence machine-learning model using intelligence training data, wherein the intelligence training data correlating one or more output data structures generated using the output generation machine-learning model to intelligence metric inputs;

calculating, by the processor, one or more intelligence metrics using the trained intelligence machine-learning model, as a function of each output data structure of the one or more output data structures, wherein at least an intelligence metric of the one or more intelligence metrics comprises an estimated likelihood of positive outcome; and wherein the one or more intelligence metrics comprises a frequency metric configured to reflect a technical difficulty level of a process;

selecting, by the processor, at least a recommended output data structure as a function of the one or more intelligence metrics; and displaying, by a user interface, the selected at least a recommended output data.

10. The method of claim 9, further comprising displaying, by the processor using a graphical user interface, the at least a recommended output data structure.

11. The method of claim 9, wherein selecting the at least a recommended output data structure comprises:

calculating an aggregate intelligence metric for each output data structure of the one or more output data structures, as a function of the one or more intelligence metrics;

ranking the one or more output data structures as a function of the aggregate intelligence metric; and selecting the at least a recommended output data structure as a function of the rank.

12. The method of claim 9, wherein:

the plurality of digital records comprises a plurality of electronic health records (EHR); and the plurality of query attributes comprises at least a diagnostic feature pertaining to the entity.

13. The method of claim 9, wherein:

the plurality of query attributes comprises at least a resource attribute and at least a positional attribute; and selecting the at least a recommended output data structure comprises identifying the at least a recommended output data structure as a function of the at least a resource attribute and the at least a positional attribute.

14. The method of claim 9, wherein:

receiving the plurality of digital records comprises grouping the plurality of digital records into a plurality of cohorts, wherein each cohort of the plurality of cohorts shares one or more reference attributes; and calculating the one or more intelligence metrics comprises:

labeling each output data structure of the one or more output data structures as a function of the plurality of cohorts; and calculating the one or more intelligence metrics as a function of the label.

15. The method of claim 9, wherein generating the one or more output data structures comprises:

receiving output generation training data comprising a plurality of exemplary output data structures as outputs correlated with a plurality of exemplary digital records as inputs;

iteratively training the output generation machine-learning model using the output generation training data; and generating the one or more output data structures using the output generation machine-learning model.

16. The method of claim 9, wherein at least an intelligence metric of the one or more intelligence metrics comprises at least a risk metric.

* * * * *